US010736172B2

(12) United States Patent
Zhang et al.

(10) Patent No.: US 10,736,172 B2
(45) Date of Patent: Aug. 4, 2020

(54) RADIO BEARER PROCESSING RELATING TO SUSPENDING DATA TRANSMISSION

(71) Applicant: Huawei Technologies Co., Ltd., Shenzhen (CN)

(72) Inventors: Tao Zhang, Beijing (CN); Bo Lin, Beijing (CN); Jie Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/426,847

(22) Filed: Feb. 7, 2017

(65) Prior Publication Data

US 2017/0149546 A1 May 25, 2017

Related U.S. Application Data

(63) Continuation of application No. PCT/CN2014/084021, filed on Aug. 8, 2014.

(51) Int. Cl.
*H04W 76/34* (2018.01)
*H04W 76/15* (2018.01)
(Continued)

(52) U.S. Cl.
CPC .......... *H04W 76/34* (2018.02); *H04L 5/0032* (2013.01); *H04L 5/0053* (2013.01); *H04W 24/00* (2013.01);
(Continued)

(58) Field of Classification Search
CPC . H04W 76/15; H04W 76/34; H04W 72/0453; H04W 72/0486
See application file for complete search history.

(56) References Cited

U.S. PATENT DOCUMENTS 9,042,315 B2 5/2015 Lin et al.
9,474,098 B2 10/2016 Wu et al.
(Continued)

FOREIGN PATENT DOCUMENTS

CN 102870450 A 1/2013
CN 103581941 A 2/2014
(Continued)

OTHER PUBLICATIONS

"RLF handling for a special cell in SCG," 3GPP TSG-RAN WG2 #85, Prague, Czech Republic, R2-140429, pp. 1-3, $3^{rd}$ Generation Partnership Project, Valbonne, France (Feb. 10-14, 2014).
(Continued)

*Primary Examiner* — Robert C Scheibel
(74) *Attorney, Agent, or Firm* — Leydig, Voit & Mayer, Ltd.

(57) ABSTRACT

Embodiments of the present invention provide a radio bearer processing method, user equipment, and a base station. The method includes: suspending, by user equipment, data transmission of a bearer on a second base station; and sending, by the user equipment, a suspend indication to a first base station, where the suspend indication is used to indicate that the user equipment has suspended the data transmission of the bearer on the second base station. When the data transmission of the bearer on the second base station is resumed, the related protocol entity does not need to be re-established, thereby improving utilization of radio bearer resources.

8 Claims, 11 Drawing Sheets

(51) Int. Cl.
H04W 72/04 (2009.01)
H04W 72/08 (2009.01)
H04W 76/19 (2018.01)
H04W 24/00 (2009.01)
H04L 5/00 (2006.01)
H04W 28/02 (2009.01)
H04W 92/20 (2009.01)

(52) U.S. Cl.
CPC ... *H04W 28/0252* (2013.01); *H04W 72/0453* (2013.01); *H04W 72/0486* (2013.01); *H04W 72/085* (2013.01); *H04W 76/15* (2018.02); *H04W 76/19* (2018.02); *H04W 92/20* (2013.01)

(56) References Cited

U.S. PATENT DOCUMENTS

| | | | |
|---|---|---|---|
| 9,838,901 B2* | 12/2017 | Lee et al. | H04W 24/08 |
| 2008/0192694 A1 | 8/2008 | Lee et al. | |
| 2012/0281548 A1 | 11/2012 | Lin et al. | |
| 2015/0049707 A1* | 2/2015 | Vajapeyam et al. | H04W 76/04 |
| 2015/0223282 A1* | 8/2015 | Vajapeyam et al. | H04W 76/02 |
| 2016/0277987 A1* | 9/2016 | Chen et al. | H04W 36/24 |
| 2017/0142770 A1 | 5/2017 | Fu et al. | |
| 2017/0171905 A1* | 6/2017 | Uchino et al. | H04W 76/04 |
| 2017/0181216 A1* | 6/2017 | Worrall et al. | H04W 76/02 |
| 2017/0303170 A1* | 10/2017 | Uchino et al. | H04W 36/00 |
| 2018/0139646 A1* | 5/2018 | Basu Mallick et al. | H04W 28/02 |

FOREIGN PATENT DOCUMENTS

| | | |
|---|---|---|
| CN | 103581942 A | 2/2014 |
| CN | 103888222 A | 6/2014 |
| RU | 2414081 C2 | 3/2011 |
| WO | 2014056130 A1 | 4/2014 |

OTHER PUBLICATIONS

"Secondary Radio Link Failure (S-RLF)," 3GPP TSG-RAN WG2 #85bis, Valencia, Spain, Tdoc R2-141542, pp. 1-5, 3$^{rd}$ Generation Partnership Project, Valbonne, France (Mar. 31-Apr. 4, 2014).

"On RLF and RLM requirements for the special SCell," 3GPP TSG-RAN WG2 meeting #85bis, Valencia, Spain, R2-141672, 3$^{rd}$ Generation Partnership Project, Valbonne, France (Mar. 31-Apr. 4, 2014).

"Discussion on S-RLF recovery," 3GPP TSG RAN2 Meeting #86, Seoul, South Korea, R2-142406, 3$^{rd}$ Generation Partnership Project, Valbonne, France (May 19-23, 2014).

"Remaining issues in S-RLF," 3GPP TSG RAN2 Meeting #86, Seoul, South Korea, R2-142411, 3$^{rd}$ Generation Partnership Project, Valbonne, France (May 19-23, 2014).

"3$^{rd}$ Generation Partnership Project; Technical Specification Group Radio Access Network; Evolved Universal Terrestrial Radio Access (E-UTRA); Mobility enhancements in heterogeneous networks (Release 11)," 3GPP TR 36.839, V11.1.0, 3$^{rd}$ Generation Partnership Project, Valbonne, France (Dec. 2012).

"3$^{rd}$ Generation Partnership Project; Technical Specification Group Radio Access Network; Evolved Universal Terrestrial Radio Access (E-UTRA); Radio Resource Conrtol (RRC); Protocol specification (Release 12)," 3GPP TS 36. 331, V12.2.0, 3$^{rd}$ Generation Partnership Project, Valbonne, France (Jun. 2014).

"More discussion about S-RLF",3GPP TSG-RAN WG2 Meeting #86, R2-142382 , Seoul, Korea, 3$^{rd}$ Generation Partnership Project, Valbonne, France (May 19-23, 2014).

"Introduction of a periodic measurement for DC-HSUPA," 3GPP TSG-RAN WG2 Meeting #80, New Orleans, US, R2-125901, 3rd Generation Partnership Project, Valbonne, France (Nov. 12-16, 2012).

"Secondary Radio Link Failure (S-RLF)," 3GPP TSG-RAN WG2 #86, Seoul, South Korea, Tdoc R2-142403, pp. 1-6, 3rd Generation Partnership Project, Valbonne, France (May 19-23, 2014).

"On RLF and RLM requirements for the special SCell," 3GPP TSG-RAN WG2 meeting #85bis, Valencia, Spain, R2-141672, pp. 1-3, 3rd Generation Partnership Project, Valbonne, France (Mar. 31-Apr. 4, 2014).

"Remaining issues of S-RLF handling," 3GPP TSG-RAN WG2 #87,Dresden, Germany, R2-143626 pp. 1-3, 3rd Generation Partnership Project, Valbonne, France (Aug. 18-22, 2014).

"Modeling of UE Actions after SCG-RLF," 3GPP TSG-RAN WG2 Meeting #87, Dresden, Germany, R2-143249, pp. 1-3, 3rd Generation Partnership Project, Valbonne, France (Aug. 18-22, 2014).

* cited by examiner

RADIO BEARER PROCESSING RELATING TO SUSPENDING DATA TRANSMISSION

CROSS-REFERENCE TO RELATED APPLICATIONS

This application is a continuation of International Application No. PCT/CN2014/084021, filed on Aug. 8, 2014, the disclosure of which is hereby incorporated by reference in its entirety.

TECHNICAL FIELD

The present invention relates to the field of wireless communications technologies, and in particular, to a radio bearer processing method, user equipment, and a base station.

BACKGROUND

In Long Term Evolution (LTE), to meet the demands of users for a higher radio bearer peak rate, two types of radio bearers (RB) are provided: one is referred to as a master cell group (MCG) bearer and the other is referred to as a split bearer. The Split bearer has a higher peak rate than that of the MCG bearer. FIG. 1 is a schematic diagram of a protocol stack architecture of an MCG bearer and a Split bearer. As shown in FIG. 1:

In user equipment (UE), one MCG bearer is associated with one Packet Data Convergence Protocol (PDCP) entity and one Radio Link Control (RLC) entity. In FIG. 1, the PDCP entity and the RLC entity are respectively represented by PDCP1 and m-RLC1, the m-RLC1 entity is associated with one corresponding Media Access Control (MAC) entity m-MAC, and the m-MAC entity corresponds to a first base station (MeNB). The protocol entities in the user equipment have their respective peer protocol entities on a network side, where peer protocol entities of the PDCP1 entity, the m-RLC1 entity, and the m-MAC entity are respectively a peer p-PDCP1 entity, a peer pm-RLC1 entity, and a peer pm-MAC entity in the MeNB. All downlink data packets of the MCG bearer are from the peer p-PDCP1 entity to the peer pm-RLC1 entity and then to the peer pm-MAC entity, and are then sent by the peer pm-MAC entity to the m-MAC entity through an air interface. Then, the m-MAC entity finally delivers the received data packets to the PDCP1 entity through the m-RLC1 entity. A transmission path of uplink data packets of the MCG bearer is opposite to a transmission path of downlink data packets of the MCG bearer.

In the user equipment, one Split bearer is associated with one PDCP2 entity and two RLC entities. In FIG. 1, the two RLC entities are respectively represented by m-RLC2 and s-RLC, where the m-RLC2 entity is associated with the m-MAC entity, the s-RLC entity is associated with an s-MAC entity, the m-MAC entity corresponds to the first base station MeNB, and the s-MAC entity corresponds to a second base station (SeNB). The protocol entities in the user equipment have their respective peer protocol entities on the network side, where peer protocol entities of the PDCP2 entity, the m-RLC2 entity, and the m-MAC entity are respectively a peer p-PDCP2, a peer pm-RLC2, and a peer pm-MAC in the MeNB; and peer protocol entities of the s-RLC entity and the s-MAC entity are respectively a peer ps-RLC entity and a peer ps-MAC entity in the SeNB. Some of downlink data packets of the Split bearer are from the peer p-PDCP2 entity to the peer pm-RLC2 entity and then to the peer pm-MAC entity, and are then sent by the peer pm-MAC entity to the m-MAC entity through an air interface. Then, the m-MAC entity finally delivers these received data packets to the PDCP2 entity through the m-RLC2 entity. The other downlink data packets of the Split bearer are sent by the peer p-PDCP2 entity to the peer ps-RLC entity through an interface between the MeNB and the SeNB, the peer ps-RLC entity delivers these data packets to the peer ps-MAC entity; then, the peer ps-MAC entity sends these data packets to the s-MAC entity through an air interface. Then the s-MAC entity finally delivers these received data packets to the PDCP2 entity through the s-RLC entity. A transmission path of uplink data packets of the Split bearer is opposite to a transmission path of downlink data packets of the Split bearer.

The MCG bearer and the Split bearer can be transformed into each other according to factors such as a change in channel environment and a data transmission requirement. However, in the prior art, when a Split bearer needs to be transformed into an MCG bearer, an MeNB determines, according to a measurement report about an SeNB that is sent by a user equipment, whether to transform a Split bearer of the user equipment into an MCG bearer, and if yes, separately notifies the user equipment and the SeNB. The user equipment needs to release an s-MAC entity and an s-RLC entity of the Split bearer, and the SeNB needs to release a peer ps-MAC entity and a peer ps-RLC entity of the Split bearer. Subsequently, when the MCG bearer obtained after the transformation needs to be transformed back to an Split bearer, the MeNB determines, according to another measurement report about the SeNB that is sent by the user equipment, whether to transform the MCG bearer back to a Split bearer, and if yes, separately notifies the user equipment and the SeNB; and the user equipment needs to re-establish the s-MAC entity and the s-RLC entity for the bearer, and the SeNB also needs to re-establish the peer ps-MAC entity and the peer ps-RLC entity for the bearer.

In the foregoing conventional manner, there is a relatively large amount of air interface signaling interaction between the user equipment and the MeNB, and there is also a relatively large amount of backbone network signaling interaction between the MeNB and the SeNB, which increases signaling load of the network and introduces a relatively long signaling delay. In addition, releasing and re-establishing a protocol entity related to a bearer results in relatively low resource utilization.

SUMMARY

Embodiments of the present invention provide a radio bearer processing method, user equipment, and a base station, to overcome the disadvantages in the existing bearer processing manner that heavy signaling load is caused, a relatively long signaling delay is introduced and resource utilization is relatively low.

A first aspect of the embodiments of the present invention provides a radio bearer processing method, including:

suspending, by user equipment, data transmission of a bearer on a second base station; and sending, by the user equipment, a suspend indication to a first base station, where the suspend indication is used to indicate that the user equipment has suspended the data transmission of the bearer on the second base station.

In a first possible implementation manner of the first aspect, the suspending, by user equipment, data transmission of a bearer on a second base station includes:

determining, by the user equipment according to a first measurement result, that the data transmission of the bearer on the second base station needs to be suspended; and performing, by the user equipment, the following operation: suspending a Radio Link Control entity s-RLC in the user equipment, where the s-RLC is associated with the bearer and corresponds to the second base station; or performing, by the user equipment, the following operation: resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

In a second possible implementation manner of the first aspect, the suspending, by user equipment, data transmission of a bearer on a second base station includes:

receiving, by the user equipment, a suspend command sent by the first base station, where the suspend command is used to instruct the user equipment to suspend the data transmission of the bearer on the second base station; and performing, by the user equipment, the following operation according to the suspend command:

suspending a Radio Link Control entity s-RLC in the user equipment, where the s-RLC is associated with the bearer and corresponds to the second base station; or performing, by the user equipment, the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

In a third possible implementation manner of the first aspect, the suspend indication is further used to instruct the first base station to send a suspend request to the second base station, where the suspend request is used to request the second base station to suspend the data transmission of the bearer on the second base station.

With reference to the first aspect or the first, second or third possible implementation manner of the first aspect, in a fourth possible implementation manner of the first aspect, after the sending, by the user equipment, a suspend indication to a first base station, the method further includes:

determining, by the user equipment according to a second measurement result, that the data transmission of the bearer on the second base station needs to be resumed;

re-establishing, by the user equipment, the Radio Link Control entity s-RLC in the user equipment and resuming the s-RLC, where the s-RLC is associated with the bearer and corresponds to the second base station; and sending, by the user equipment, a resume indication to the first base station, where the resume indication is used to instruct the first base station to send a resume request to the second base station, where the resume request is used to request the second base station to resume the data transmission of the bearer on the second base station.

With reference to the first aspect or the first, second or third possible implementation manner of the first aspect, in a fifth possible implementation manner of the first aspect, after the sending, by the user equipment, a suspend indication to a first base station, the method further includes:

sending, by the user equipment, a second measurement result to the first base station; and receiving, by the user equipment, a resume command sent by the first base station, re-establishing, according to the resume command, the Radio Link Control entity s-RLC in the user equipment and resuming the s-RLC, where the s-RLC is associated with the bearer and corresponds to the second base station, and the resume command is sent by the first base station after the first base station determines according to the second measurement result that the data transmission of the bearer on the second base station needs to be resumed.

With reference to the first, second, third, fourth or fifth possible implementation manner of the first aspect, in a sixth possible implementation manner of the first aspect, the first measurement result and the second measurement result are results obtained by the user equipment by measuring at least one of the following measurement objects:

a status of a radio link between the user equipment and the second base station, signal strength of the second base station, signal quality of the second base station, and a quantity or volume of data packets to be sent by the user equipment over the bearer.

A second aspect of the embodiments of the present invention provides a radio bearer processing method, including:

receiving, by a first base station, a suspend indication sent by user equipment; and determining, by the first base station according to the suspend indication, that the user equipment suspends data transmission of a bearer on a second base station.

In a first possible implementation manner of the second aspect, after the receiving, by a first base station, a suspend indication sent by user equipment, the method further includes:

sending, by the first base station, a suspend request to the second base station, where the suspend request is used to request the second base station to suspend the data transmission of the bearer on the second base station.

With reference to the first possible implementation manner of the second aspect, in a second possible implementation manner of the second aspect, the sending, by the first base station, a suspend request to the second base station, where the suspend request is used to request the second base station to suspend the data transmission of the bearer on the second base station includes:

sending, by the first base station, the suspend request to the second base station, where the suspend request is used to request the second base station to perform the following operation:

suspending a Radio Link Control entity ps-RLC in the second base station, where the ps-RLC is associated with the bearer; or the suspend request is used to request the second base station to perform the following operation:

resetting a Media Access Control entity ps-MAC in the second base station, where the ps-MAC is associated with the bearer; and suspending a Radio Link Control entity ps-RLC in the second base station, where the ps-RLC is associated with the bearer.

In a third possible implementation manner of the second aspect, after the receiving, by a first base station, a suspend indication sent by user equipment, the method further includes:

receiving, by the first base station, a resume indication sent by the user equipment; and sending, by the first base station, a first resume request to the second base station according to the resume indication, where the first resume request is used to request the second base station to resume the data transmission of the bearer on the second base station.

With reference to the third possible implementation manner of the second aspect, in a fourth possible implementation manner of the second aspect, the sending, by the first base station, a first resume request to the second base station according to the resume indication, where the first resume request is used to request the second base station to resume the data transmission of the bearer on the second base station includes:

sending, by the first base station, the first resume request to the second base station according to the resume indication, where the first resume request is used to request the second base station to perform the following operation:

re-establishing a Radio Link Control entity ps-RLC in the second base station and resuming the ps-RLC, where the ps-RLC is associated with the bearer; or the first resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

In a fifth possible implementation manner of the second aspect, after the receiving, by a first base station, a suspend indication sent by user equipment, the method further includes:

determining, by the first base station, that the data transmission of the bearer on the second base station needs to be resumed; and sending, by the first base station, the resume command to the user equipment, and sending a second resume request to the second base station, where the resume command is used to instruct the user equipment to resume the data transmission of the bearer on the second base station, and the second resume request is used to request the second base station to resume the data transmission of the bearer on the second base station.

With reference to the fifth possible implementation manner of the second aspect, in a sixth possible implementation manner of the second aspect, before the determining, by the first base station, that the data transmission of the bearer on the second base station needs to be resumed, the method further includes:

receiving, the first base station, a second measurement result sent by the user equipment; and the determining, by the first base station, that the data transmission of the bearer on the second base station needs to be resumed includes:

determining, by the first base station according to the second measurement result, that the data transmission of the bearer on the second base station needs to be resumed.

With reference to the fifth possible implementation manner of the second aspect, in a seventh possible implementation manner of the second aspect, the sending, by the first base station, a resume command to the user equipment, where the resume command is used to instruct the user equipment to resume the data transmission of the bearer on the second base station includes:

sending, by the first base station, the resume command to the user equipment, where the resume command is used to instruct the user equipment to re-establish a Radio Link Control entity s-RLC in the user equipment and resume the s-RLC, where the s-RLC is associated with the bearer and corresponds to the second base station.

With reference to the fifth possible implementation manner of the second aspect, in an eighth possible implementation manner of the second aspect, the sending, by the first base station, a second resume request to the second base station, where the second resume request is used to request the second base station to resume the data transmission of the bearer on the second base station includes:

sending, by the first base station, the second resume request to the second base station, where the second resume request is used to request the second base station to perform the following operation:

re-establishing a Radio Link Control entity ps-RLC in the second base station and resuming the ps-RLC, where the ps-RLC is associated with the bearer; or the second resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

A third aspect of the embodiments of the present invention provides a radio bearer processing method, including:

suspending, by a second base station, data transmission of a bearer on the second base station; and sending, by the second base station, a suspend indication to a first base station, where the suspend indication is used to indicate that the second base station has suspended the data transmission of the bearer on the second base station.

In a first possible implementation manner of the third aspect, the suspending, by a second base station, data transmission of a bearer on the second base station includes:

determining, by the second base station according to a measurement result, that the data transmission of the bearer on the second base station needs to be suspended; and performing, by the second base station, the following operation:

suspending a Radio Link Control entity ps-RLC in the second base station, where the ps-RLC is associated with the bearer; or performing, by the second base station, the following operation:

resetting a Media Access Control entity ps-MAC in the second base station, where the ps-MAC is associated with the bearer, and suspending a Radio Link Control entity ps-RLC in the second base station, where the ps-RLC is associated with the bearer.

With reference to the first possible implementation manner of the third aspect, in a second possible implementation manner of the third aspect, the suspend indication is further used to instruct the first base station to send a suspend command to user equipment, where the suspend command is used to instruct the user equipment to suspend the data transmission of the bearer on the second base station.

With reference to the first possible implementation manner of the third aspect, in a third possible implementation manner of the third aspect, after the sending, by the second base station, a suspend indication to a first base station, the method further includes:

receiving, by the second base station, a resume request sent by the first base station; and resuming, by the second base station, the data transmission of the bearer on the second base station according to the resume request.

With reference to the third possible implementation manner of the third aspect, in a fourth possible implementation manner of the third aspect, the resuming, by the second base station, the data transmission of the bearer on the second base station according to the resume request includes:

re-establishing, by the second base station, a Radio Link Control entity ps-RLC in the second base station according to the resume request, where the ps-RLC is associated with the bearer, and resuming the ps-RLC.

With reference to the first, second, third or fourth possible implementation manner of the third aspect, in a fifth possible implementation manner of the third aspect, the measurement result is a result obtained by the second base station by measuring at least one of the following measurement objects:

uplink signal strength of the user equipment, uplink signal quality of the user equipment, and a quantity of times of retransmission of the Radio Link Control entity ps-RLC.

A fourth aspect of the embodiments of the present invention provides user equipment, including:

a processing module, configured to suspend data transmission of a bearer on a second base station; and a sending module, configured to send a suspend indication to a first base station, where the suspend indication is used to indicate that the user equipment has suspended the data transmission of the bearer on the second base station.

In a first possible implementation manner of the fourth aspect, the processing module includes:

a determining unit, configured to determine, according to a first measurement result, that the data transmission of the bearer on the second base station needs to be suspended; and a processing unit, configured to perform the following operation:

suspending a Radio Link Control entity s-RLC in the user equipment, where the s-RLC is associated with the bearer and corresponds to the second base station; or the processing unit being configured to perform the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

In a second possible implementation manner of the fourth aspect, the user equipment further includes:

a receiving module, configured to receive a suspend command sent by the first base station, where the suspend command is used to instruct the user equipment to suspend the data transmission of the bearer on the second base station; and the processing unit is further configured to perform the following operation:

suspending a Radio Link Control entity s-RLC in the user equipment, where the s-RLC is associated with the bearer and corresponds to the second base station; or the processing unit is further configured to perform the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

In a third possible implementation manner of the fourth aspect, the suspend indication is further used to instruct the first base station to send a suspend request to the second base station, where the suspend request is used to request the second base station to suspend the data transmission of the bearer on the second base station.

With reference to the fourth aspect or the first, second or third possible implementation manner of the fourth aspect, in a fourth possible implementation manner of the fourth aspect, the determining unit is further configured to determine, according to a second measurement result, that the data transmission of the bearer on the second base station needs to be resumed;

the processing unit is further configured to re-establish a Radio Link Control entity s-RLC in the user equipment and resume the s-RLC, where the s-RLC is associated with the bearer and corresponds to the second base station; and the processing module further includes: a sending unit, configured to send a resume indication to the first base station, where the resume indication is used to instruct the first base station to send a resume request to the second base station, where the resume request is used to request the second base station to resume the data transmission of the bearer on the second base station.

With reference to the fourth aspect or the first, second or third possible implementation manner of the fourth aspect, in a fifth possible implementation manner of the fourth aspect, the sending unit is further configured to send a second measurement result to the first base station; and the processing unit is further configured to receive a resume command sent by the first base station, re-establish, according to the resume command, the Radio Link Control entity s-RLC in the user equipment and resume the s-RLC, where the s-RLC is associated with the bearer and corresponds to the second base station, and the resume command is sent by the first base station after the first base station determines according to the second measurement result that the data transmission of the bearer on the second base station needs to be resumed.

A fifth aspect of the embodiments of the present invention provides a first base station, including:

a receiving module, configured to receive a suspend indication sent by user equipment; and a processing module, configured to determine, according to the suspend indication, that the user equipment suspends data transmission of a bearer on a second base station.

In a first possible implementation manner of the fifth aspect, the first base station further includes:

a sending module, configured to send a suspend request to the second base station, where the suspend request is used to request the second base station to suspend the data transmission of the bearer on the second base station.

With reference to the first possible implementation manner of the fifth aspect, in a second possible implementation manner of the fifth aspect, the sending module is specifically configured to:

send the suspend request to the second base station, where the suspend request is used to request the second base station to perform the following operation:

suspending a Radio Link Control entity ps-RLC in the second base station, where the ps-RLC is associated with the bearer; or send the suspend request to the second base station, where the suspend request is used to request the second base station to perform the following operation:

resetting a Media Access Control entity ps-MAC in the second base station, where the ps-MAC is associated with the bearer, and suspending a Radio Link Control entity ps-RLC in the second base station, where the ps-RLC is associated with the bearer.

In a third possible implementation manner of the fifth aspect, the receiving module is further configured to:

receive a resume indication sent by the user equipment; and the sending module is further configured to: send a first resume request to the second base station according to the resume indication, where the first resume request is used to request the second base station to resume the data transmission of the bearer on the second base station.

With reference to the third possible implementation manner of the fifth aspect, in a fourth possible implementation manner of the fifth aspect, the sending module is specifically configured to:

send the first resume request to the second base station according to the resume indication, where the first resume request is used to request the second base station to perform the following operation:

re-establishing a Radio Link Control entity ps-RLC in the second base station and resuming the ps-RLC, where the ps-RLC is associated with the bearer; or send the first resume request to the second base station according to the resume indication, where the first resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

In a fifth possible implementation manner of the fifth aspect, the first base station further includes:

a determining module, configured to determine according to that the data transmission of the bearer on the second base station needs to be resumed; and the sending module is further configured to: send a resume command to the user equipment, and send a second resume request to the second base station, where the resume command is used to instruct the user equipment to resume the data transmission of the bearer on the second base station, and the second resume request is used to request the second base station to resume the data transmission of the bearer on the second base station.

With reference to the fifth possible implementation manner of the fifth aspect, in a sixth possible implementation manner of the fifth aspect, the receiving module is further configured to:

receive a second measurement result sent by the user equipment; and the determining module is further configured to determine, according to the second measurement result, that the data transmission of the bearer on the second base station needs to be resumed.

With reference to the fifth possible implementation manner of the fifth aspect, in a seventh possible implementation manner of the fifth aspect, the sending module is specifically configured to:

send a resume command to the user equipment, where the resume command is used to instruct the user equipment to re-establish a Radio Link Control entity s-RLC in the user equipment and resume the s-RLC, where the s-RLC is associated with the bearer and corresponds to the second base station.

With reference to the fifth possible implementation manner of the fifth aspect, in an eighth possible implementation manner of the fifth aspect, the sending module is specifically configured to:

send the second resume request to the second base station, where the second resume request is used to request the second base station to perform the following operation:

re-establishing a Radio Link Control entity ps-RLC in the second base station and resuming the ps-RLC, where the ps-RLC is associated with the bearer; or send the second resume request to the second base station, where the second resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

A sixth aspect of the embodiments of the present invention provides a second base station, including:

a processing module, configured to suspend data transmission of a bearer on the second base station; and a sending module, configured to send a suspend indication to a first base station, where the suspend indication is used to indicate that the second base station has suspended the data transmission of the bearer on the second base station.

In a first possible implementation manner of the sixth aspect, the processing module includes:

a determining unit, configured to determine, according to a measurement result, that the data transmission of the bearer on the second base station needs to be suspended; and a processing unit, configured to perform the following operation:

suspending a Radio Link Control entity ps-RLC in the second base station, where the ps-RLC is associated with the bearer; or the processing unit being configured to perform the following operation:

resetting a Media Access Control entity ps-MAC in the second base station, where the ps-MAC is associated with the bearer, and suspending a Radio Link Control entity ps-RLC in the second base station, where the ps-RLC is associated with the bearer.

With reference to the first possible implementation manner of the sixth aspect, in a second possible implementation manner of the sixth aspect, the suspend indication is further used to instruct the first base station to send a suspend command to user equipment, where the suspend command is used to instruct the user equipment to suspend the data transmission of the bearer on the second base station.

With reference to the first possible implementation manner of the sixth aspect, in a third possible implementation manner of the sixth aspect, the second base station further includes:

a receiving module, configured to receive a resume request sent by the first base station; and the processing module is further configured to resume the data transmission of the bearer on the second base station according to the resume request.

With reference to the third possible implementation manner of the sixth aspect, in a fourth possible implementation manner of the sixth aspect, the processing module is specifically configured to:

re-establish a Radio Link Control entity ps-RLC in the second base station according to the resume request, where the ps-RLC is associated with the bearer, and resume the ps-RLC.

With reference to the third possible implementation manner of the sixth aspect, in a fifth possible implementation manner of the sixth aspect, the measurement result is a result obtained by the second base station by measuring at least one of the following measurement objects:

uplink signal strength of the user equipment, uplink signal quality of the user equipment, and a quantity of times of retransmission of the Radio Link Control entity ps-RLC.

A seventh aspect of the embodiments of the present invention provides user equipment, including:

a memory and a processor connected to the memory, where the memory is configured to store a set of program code, and the processor is configured to call the program code stored in the memory, to execute the method according to any one of the first aspect of the embodiments of the present invention and the possible implementation manners of the first aspect.

An eighth aspect of the embodiments of the present invention provides a first base station, including:

a memory and a processor connected to the memory, where the memory is configured to store a set of program code, and the processor is configured to call the program code stored in the memory, to execute the method according to any one of the second aspect of the embodiments of the present invention and the possible implementation manners of the second aspect.

A ninth aspect of the embodiments of the present invention provides a second base station, including:

a memory and a processor connected to the memory, where the memory is configured to store a set of program code, and the processor is configured to call the program code stored in the memory, to execute the method according to any one of the third aspect of the embodiments of the present invention and the possible implementation manners of the third aspect.

According to the radio bearer processing method, the user equipment and the base station that are provided by the embodiments of the present invention, after suspending data transmission of a bearer on a second base station, the user equipment sends, to a first base station, a suspend indication used to indicate that the user equipment has suspended the data transmission of the bearer on the second base station. Because the user equipment can determine by itself whether to suspend the data transmission of the bearer on the second base station and does not need to interact with the first base station to cause the first base station to determine whether to suspend the data transmission of the bearer on the second base station, signaling overheads are reduced. In addition, the data transmission of the bearer on the second base station is stopped in a suspended manner, and a protocol entity related to the bearer does not need to be deleted, so that subsequently when the data transmission of the bearer on the second base station is resumed, the related protocol entity does not need to be re-established, thereby effectively improving utilization of radio bearer resources.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

Figure 3:
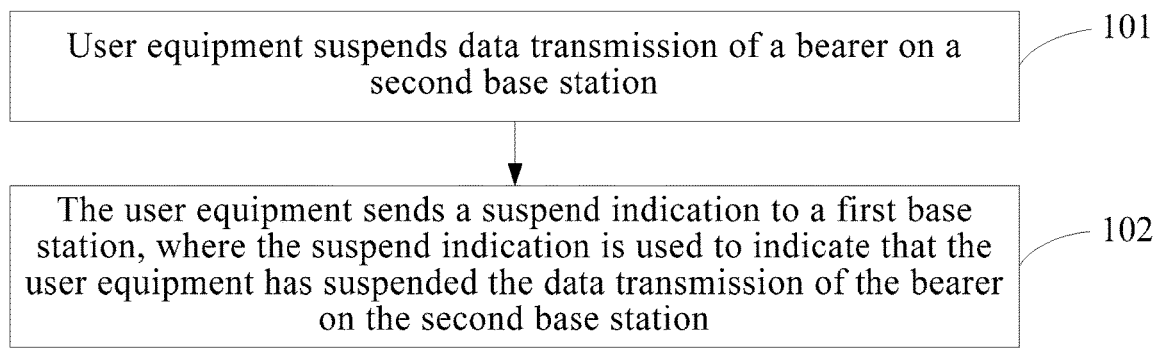
FIG. 3 is a flowchart of a radio bearer processing method according to Embodiment 1 of the present invention.

FIG. 3 is a flowchart of a radio bearer processing method according to Embodiment 1 of the present invention. As shown in FIG. 3, the method provided in this embodiment is particularly applicable to an LTE system, and the method specifically includes:

Step 101. User equipment suspends data transmission of a bearer on a second base station.

Step 102. The user equipment sends a suspend indication to a first base station, where the suspend indication is used to indicate that the user equipment has suspended the data transmission of the bearer on the second base station.

Figure 1:
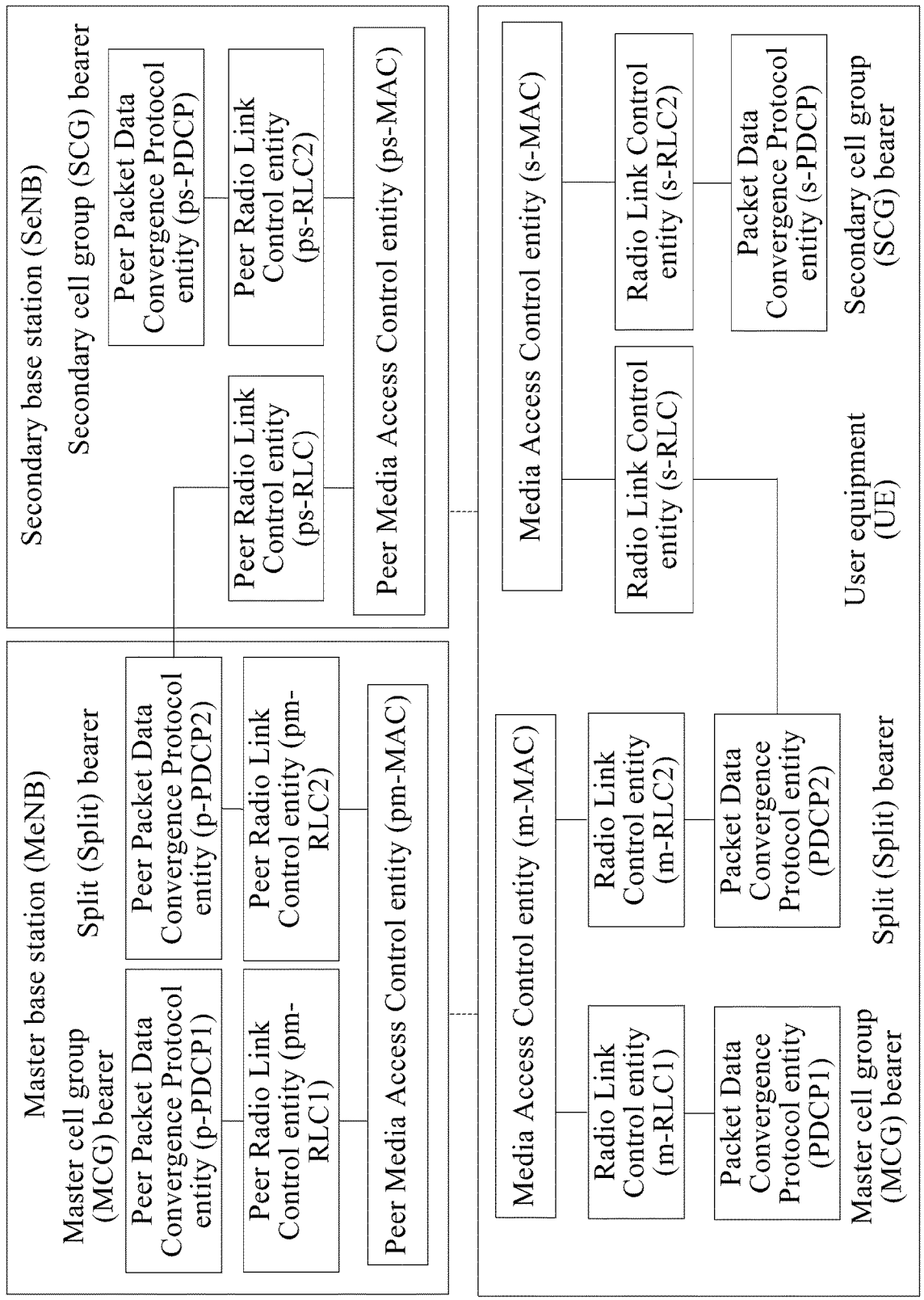
FIG. 1 is a schematic diagram of a protocol stack architecture of an MCG bearer and a Split bearer.

In the LTE system, in addition to an MCG bearer and a Split bearer, there is another type of bearer: secondary cell group (SCG) bearer. Similar to the Split bearer, the SCG bearer can also be transformed from or into an MCG bearer. In the user equipment, one SCG bearer is associated with one PDCP entity and one RLC entity. In FIG. 1, the PDCP entity and the RLC entity are respectively represented by s-PDCP and s-RLC2, the s-RLC2 entity is associated with a corresponding MAC entity s-MAC, and the s-MAC entity corresponds to an SeNB. Protocol entities in the user equipment have their respective peer protocol entities on a network side, where peer protocol entities of the s-PDCP entity, the s-RLC2 entity, and the s-MAC entity are respectively a peer ps-PDCP entity, a peer ps-RLC2 entity, and a peer ps-MAC entity in the SeNB. All downlink data packets of the SCG bearer are from the peer ps-PDCP entity to the peer ps-RLC2 entity and then to the peer ps-MAC entity, and are then sent by the peer ps-MAC entity to the s-MAC entity through an air interface. Then, the s-MAC entity finally delivers the received data packets to the s-PDCP entity through the s-RLC2 entity. A transmission path of uplink data packets of the SCG bearer is opposite to a transmission path of downlink data packets of the SCG bearer.

Figure 2:
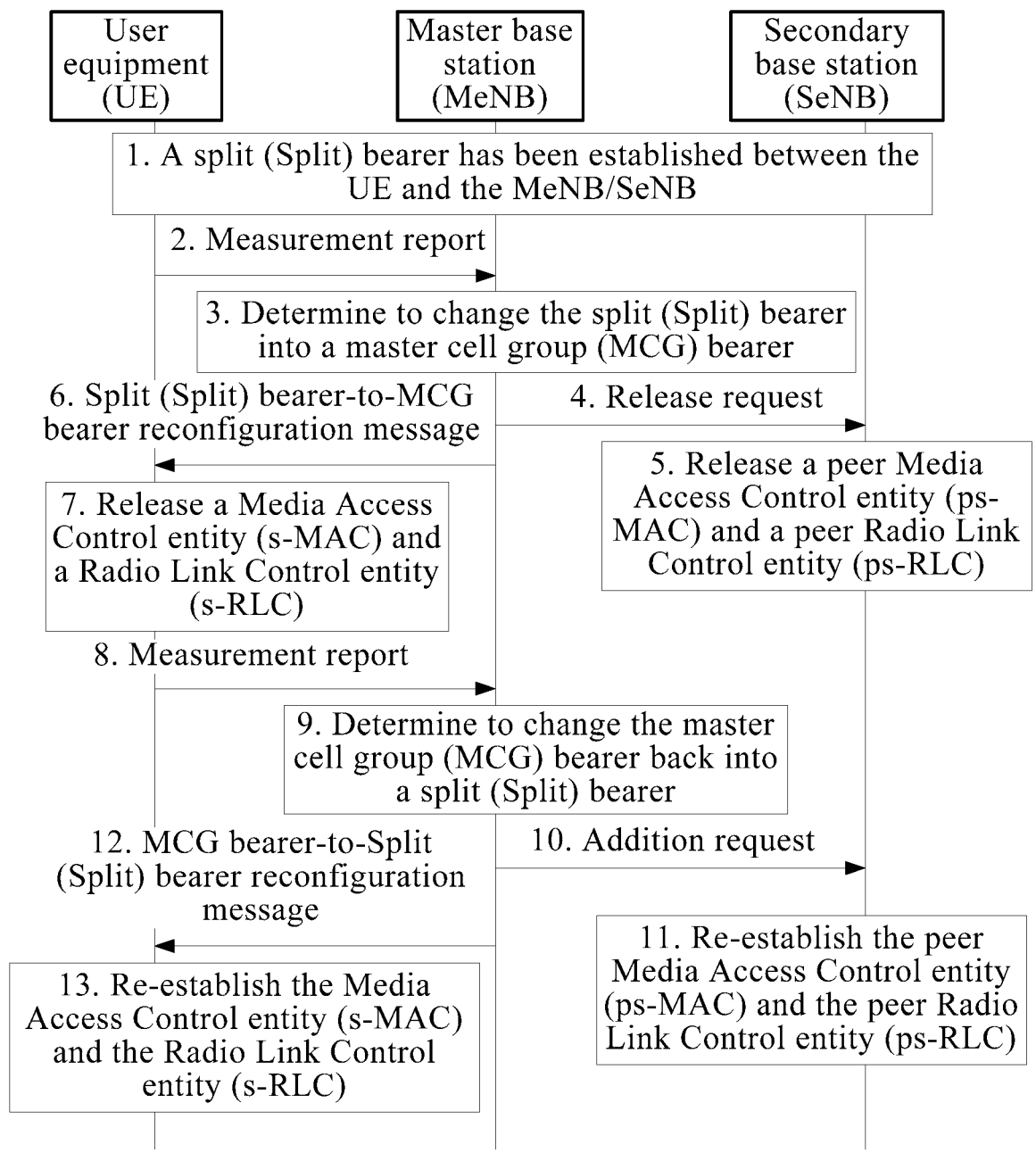
FIG. 2 is a schematic diagram of signaling interaction of mutual transformation between an MCG bearer and a Split bearer in the prior art.

By using mutual transformation between the Split bearer and the MCG bearer as an example, FIG. 2 is a schematic diagram of signaling interaction of mutual transformation between an MCG bearer and a Split bearer in the prior art. As shown in FIG. 2, in an LTE system, by using the Split bearer as an example, a manner in which the Split bearer is processed is that the Split bearer is transformed into an MCG bearer when the Split bearer cannot meet a communication requirement, and subsequently the MCG bearer is transformed back into the Split bearer when the Split bearer meets the communication requirement. In an existing solution of implementing mutual transformation between the MCG bearer and the Split bearer, whether mutual transformation between the MCG bearer and the Split bearer needs to be performed is determined by an MeNB according to a measurement report that is reported by a user equipment after the user equipment performs measurement on the SeNB, and in the process of implementing mutual transformation between the MCG bearer and the Split bearer, the user equipment and the SeNB need to separately re-establish or delete a protocol entity related to the Split bearer. Moreover, in actual applications, due to mobility of the user equipment, as the user equipment moves away from and approaches the SeNB from time to time, frequent mutual transformation between the MCG bearer and the Split bearer is caused, which often leads to heavy signaling load and a long signaling delay. For example, four pieces of air interface signaling (steps 2, 6, 8 and 12) and two pieces of backbone network signaling (steps 4 and 10) that are caused in FIG. 2, and also leads to low utilization of radio bearer resources.

To overcome the foregoing disadvantages, in the radio bearer processing method provided by this embodiment of the present invention, radio bearer processing is implemented in the following manner. It should be noted that the method provided by this embodiment of the present invention is particularly applicable to a case of processing a Split bearer or an SCG bearer, the following embodiments are described by using the Split bearer as an example; and the same applies to the SCG bearer, only the related protocol entity needs to be replaced, and details are not described again. In addition, in the following embodiments, the first base station refers to a master base station MeNB, and the second base station refers to a secondary base station SeNB.

Figure 4:
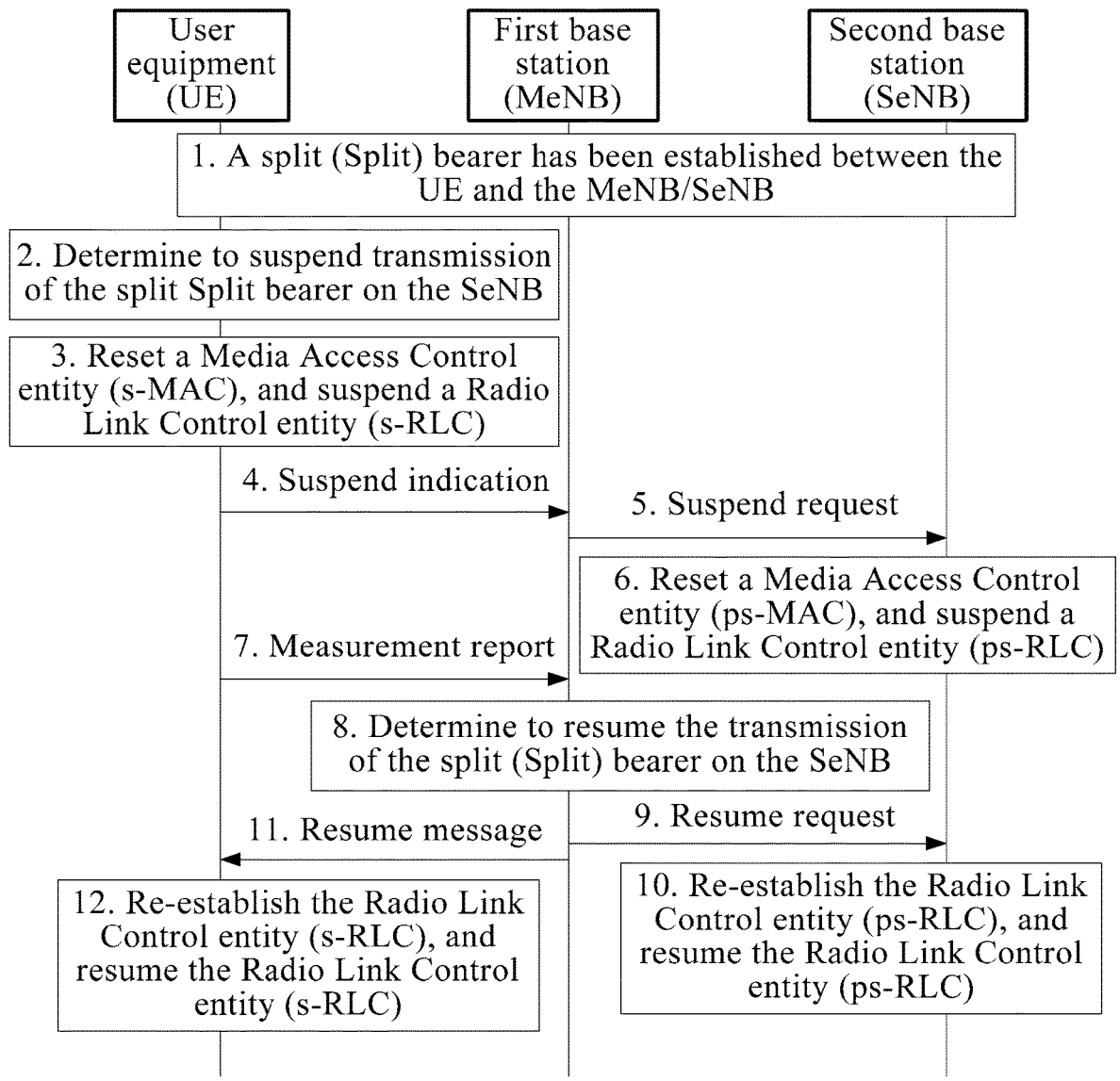
FIG. 4 is a schematic diagram of signaling interaction of a radio bearer processing method according to Embodiment 2 of the present invention.

Specifically, as shown in FIG. 4, FIG. 4 is a schematic diagram of signaling interaction of a radio bearer processing method according to Embodiment 2 of the present invention. In this embodiment, the user equipment can determine by itself whether to perform processing of suspending the Split bearer. It should be noted that in this embodiment of the present invention, the data transmission of the bearer on the second base station is suspended, where suspend (suspend) has a meaning equivalent to that of stop. Specifically, the suspending, by user equipment, data transmission of a bearer on a second base station in step 101 is specifically implemented in the following manner:

determining, by the user equipment according to a first measurement result, that the data transmission of the bearer on the second base station needs to be suspended. Specifically, the user equipment UE determines, according to the first measurement result, whether to suspend data transmission of the Split bearer on the second base station SeNB; and if yes, the user equipment UE performs the following operation:

suspending a Radio Link Control entity s-RLC in the user equipment, where the s-RLC is associated with the bearer and corresponds to the second base station; or the user equipment performs the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

The first measurement result is a result obtained by the user equipment UE by measuring at least one of the following measurement objects:

a status of a radio link between the user equipment UE and the second base station SeNB, signal strength of the second base station SeNB, signal quality of the second base station SeNB, and a quantity or volume of data packets to be sent by the user equipment UE over the bearer.

The premise of executing the method of this embodiment is that a Split bearer has been established between the user equipment and the MeNB and SeNB. When determining, according to the first measurement result that is obtained by measuring at least one of the foregoing preset measurement objects, that the Split bearer is not suitable for data transmission on the SeNB, the user equipment determines to suspend the data transmission of the Split bearer on the SeNB.

That the user equipment determines to suspend the transmission of the Split bearer on the SeNB means that the user equipment determines to no longer receive downlink data of the Split bearer from the SeNB and no longer send uplink data of the Split bearer to the SeNB.

Specifically, the user equipment may determine according to a measurement result about the SeNB. For example, the user equipment performs radio link monitoring (RLM) on the SeNB, and when determining according to the RLM that a radio link failure (RLF) occurs in the radio link between the user equipment and the SeNB, the user equipment determines to perform suspension. For another example, the user equipment measures the signal strength or quality of the SeNB, and when determining according to a measurement result that the signal strength or quality of the SeNB is lower than a preset threshold, the user equipment determines to perform suspension. Alternatively, the user equipment may determine to perform suspension according to a quantity of data packets to be sent over the Split bearer or a buffer status of data packets to be sent over the Split bearer. For example, the user equipment determines to suspend when determining that the quantity of data packets to be sent over the Split bearer or a buffer size of data packets to be sent over the Split bearer is less than a preset value.

After the user equipment determines to suspend the Split bearer, the user equipment first needs to suspend a protocol entity that is in the user equipment and associated with the Split bearer. Specifically, this may be implemented in the following manner: suspending, by the user equipment, a Radio Link Control entity s-RLC in the user equipment, where the s-RLC is associated with the Split bearer and corresponds to the second base station SeNB; or implemented in the following manner: resetting, by the user equipment, a Media Access Control entity s-MAC in the user equipment, where the s-MAC is associated with the Split bearer and corresponds to the second base station SeNB, and suspending a Radio Link Control entity s-RLC in the user equipment, where the s-RLC is associated with the Split bearer and corresponds to the second base station SeNB.

Resetting the s-MAC entity specifically includes: emptying a buffer used by the s-MAC, reinitializing a status variable used by the s-MAC, stopping a timer used by the s-MAC, and so on; suspending the s-RLC entity specifically includes stopping processing of data packets by the s-RLC, for example, stopping sending or receiving data packets.

Then, the user equipment sends a suspend indication to the MeNB, where the suspend indication is used to indicate that the user equipment has suspended the data transmission of the Split bearer on the second base station SeNB.

As shown in FIG. 4, in the process of suspending the Split bearer by the user equipment, only one piece of air interface signaling, that is, the suspend indication, is sent to the MeNB, and compared with FIG. 2, one piece of air interface signaling is saved.

Optionally, the suspend indication may further include a suspension cause, for example, when the user equipment detects that an RLF occurs in the radio link between the user equipment and the SeNB, the suspension cause included in the suspend indication may be a reason that causes the RLF.

In this embodiment, after suspending data transmission of a bearer on a second base station, user equipment sends, to a first base station, a suspend indication that is used to indicate that the user equipment has suspended the data transmission of the bearer on the second base station. Because the user equipment can determine by itself whether to suspend the data transmission of the bearer on the second base station and does not need to interact with the first base station to cause the first base station to determine whether to suspend the data transmission of the bearer on the second base station, signaling overheads are reduced. In addition, the data transmission of the bearer on the second base station is stopped in a suspended manner, and a protocol entity related to the bearer does not need to be deleted, so that subsequently when the data transmission of the bearer on the second base station is resumed, the related protocol entity does not need to be re-established, thereby effectively improving utilization of radio bearer resources.

Optionally, the suspend indication is further used to instruct the MeNB to send a suspend request to the SeNB, where the suspend request is used to request the SeNB to suspend the data transmission of the bearer on the SeNB, so that the SeNB suspends the data transmission of the Split bearer according to the suspend request.

Specifically, as shown in FIG. 4, after receiving the suspend indication sent by the user equipment, the MeNB sends a suspend request to the SeNB according to the suspend indication; after receiving the suspend request, the SeNB may suspend a Radio Link Control entity ps-RLC in the SeNB, where the ps-RLC is associated with the Split bearer; or may reset a Media Access Control entity ps-MAC in the SeNB, where the ps-MAC is associated with the bearer, and suspend a Radio Link Control entity ps-RLC in the second base station, where the ps-RLC is associated with the bearer. The process of resetting the ps-MAC entity of the Split bearer and suspending the ps-RLC entity of the Split bearer is similar to the process of resetting the s-MAC entity of the Split bearer and suspending the s-RLC entity of the Split bearer by the user equipment, and details are not described again. It should be understood that that the SeNB resets the Media Access Control entity ps-MAC, in the SeNB, that is associated with the Split bearer is an optional step, and only when the user equipment has reset the s-MAC during suspension, the SeNB needs to correspondingly reset the ps-MAC.

Further, after the sending, by the user equipment, a suspend indication to the MeNB, the method further includes: interacting, by the user equipment, with the MeNB according to a second measurement result and resuming the data transmission of the Split bearer on the SeNB.

The second measurement result is a result obtained by the user equipment by measuring at least one of the following measurement objects: a status of a radio link between the user equipment and the SeNB, signal strength of the SeNB, signal quality of the SeNB, and a quantity or volume of data packets to be sent by the user equipment over the Split bearer.

Figure 5:
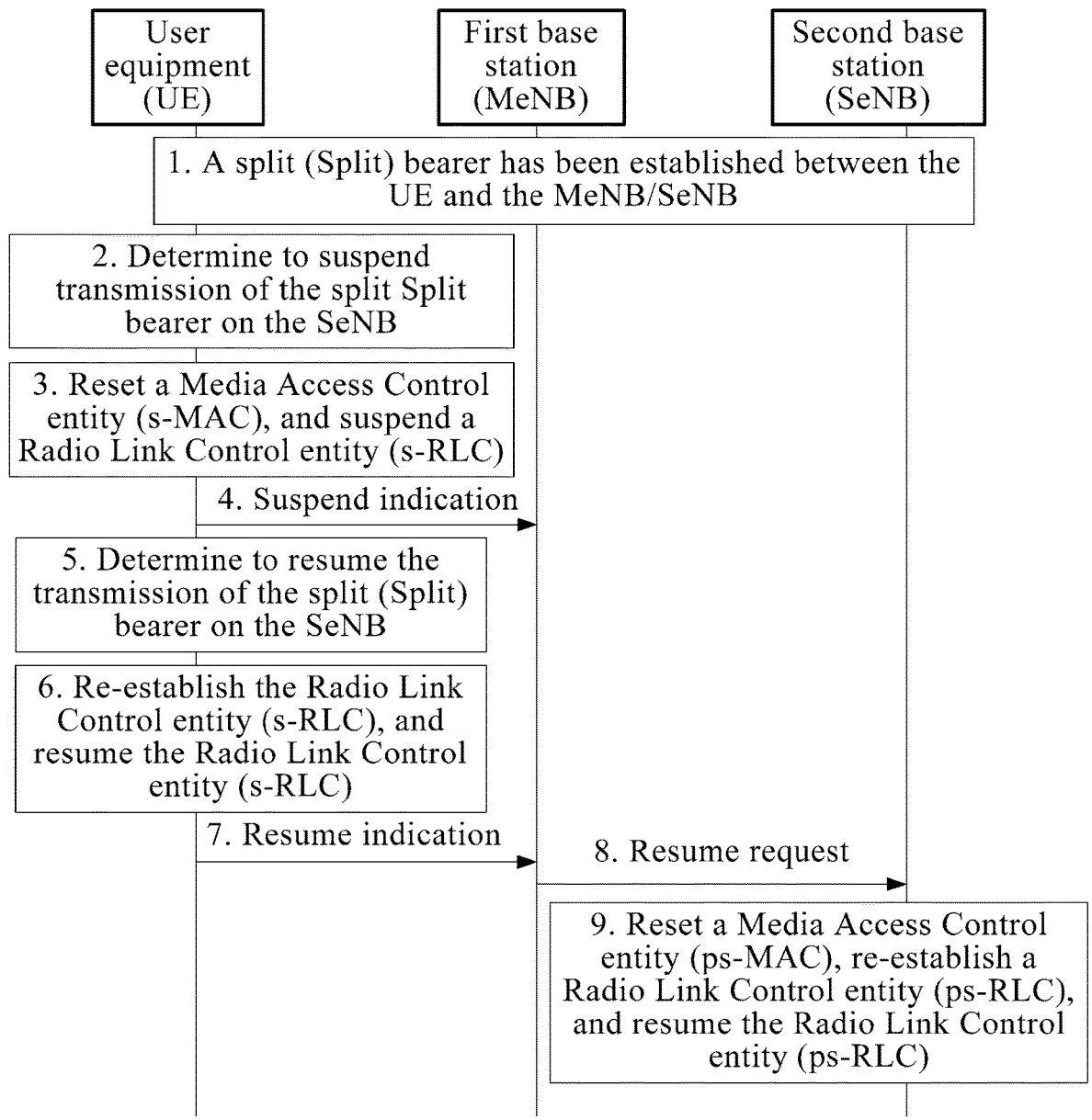
FIG. 5 is a schematic diagram of signaling interaction of a radio bearer processing method according to Embodiment 3 of the present invention.

Optionally, that the user equipment interacts with the MeNB according to the second measurement result and resumes the data transmission of the Split bearer on the SeNB may be implemented in a manner shown in FIG. 5:

determining, by the user equipment according to the second measurement result, that the data transmission of the bearer on the SeNB needs to be resumed;

re-establishing, by the user equipment, the Radio Link Control entity s-RLC in the user equipment and resuming the s-RLC, where the s-RLC is associated with the bearer and corresponds to the SeNB; and sending, by the user equipment, a resume indication to the MeNB, where the resume indication is used to instruct the MeNB to send a resume request to the SeNB, where the resume request is used to request the SeNB to resume the data transmission of the bearer on the SeNB.

Specifically, that the user equipment determines according to the second measurement result that the data transmission of the bearer on the SeNB needs to be resumed may be implemented in the following manner: determining, by the user equipment according to the second measurement result, whether to resume the data transmission of the Split bearer on the SeNB; and if yes, re-establishing, by the user equipment, the Radio Link Control entity s-RLC in the user equipment and resuming the s-RLC, where the s-RLC is associated with the Split bearer and corresponds to the SeNB; and sending, by the user equipment, a resume indication to the MeNB, so that the MeNB sends a first resume request to the SeNB according to the resume indication, and the SeNB resumes the data transmission of the Split bearer on the SeNB according to the first resume request.

Specifically, the user equipment may determine to resume according to a new measurement result about the SeNB. For example, the user equipment performs radio link monitoring (RLM) on the SeNB, and when determining according to the RLM that the radio link between the user equipment and the SeNB returns back to a normal connected state, the user equipment determines to resume. For another example, the user equipment measures the signal strength or quality of the SeNB, and when determining according to a measurement result that the signal strength or quality of the SeNB is higher than a preset threshold, the user equipment determines to resume. Alternatively, the user equipment may determine according to a quantity of data packets to be sent over the Split bearer or a buffer status of data packets to be sent over the Split bearer. For example, the user equipment determines to resume when determining that the quantity of data packets to be sent over the Split bearer or a buffer size of data packets to be sent over the Split bearer is greater than a preset value.

In addition, after receiving the resume request, the SeNB re-establishes the Radio Link Control entity ps-RLC in the SeNB and resumes the ps-RLC, where the ps-RLC is associated with the Split bearer; or resets the Media Access Control entity ps-MAC, in the SeNB, that is associated with the Split bearer, and re-establishes the Radio Link Control entity ps-RLC in the SeNB and resumes the ps-RLC, where the ps-RLC is associated with the Split bearer. Re-establishing the ps-RLC entity specifically includes, for example, sending a successfully received data packet to the MeNB, discarding a data packet that needs to be sent but has not been successfully sent, stopping and resetting a timer used by the ps-RLC entity, reinitializing a status variable used by the ps-RLC entity, and so on. Resuming the ps-RLC entity means starting processing of data packets by the ps-RLC entity.

It should be noted that the measurement report shown in FIG. 5 corresponds to the second measurement result in this embodiment.

Figure 6:
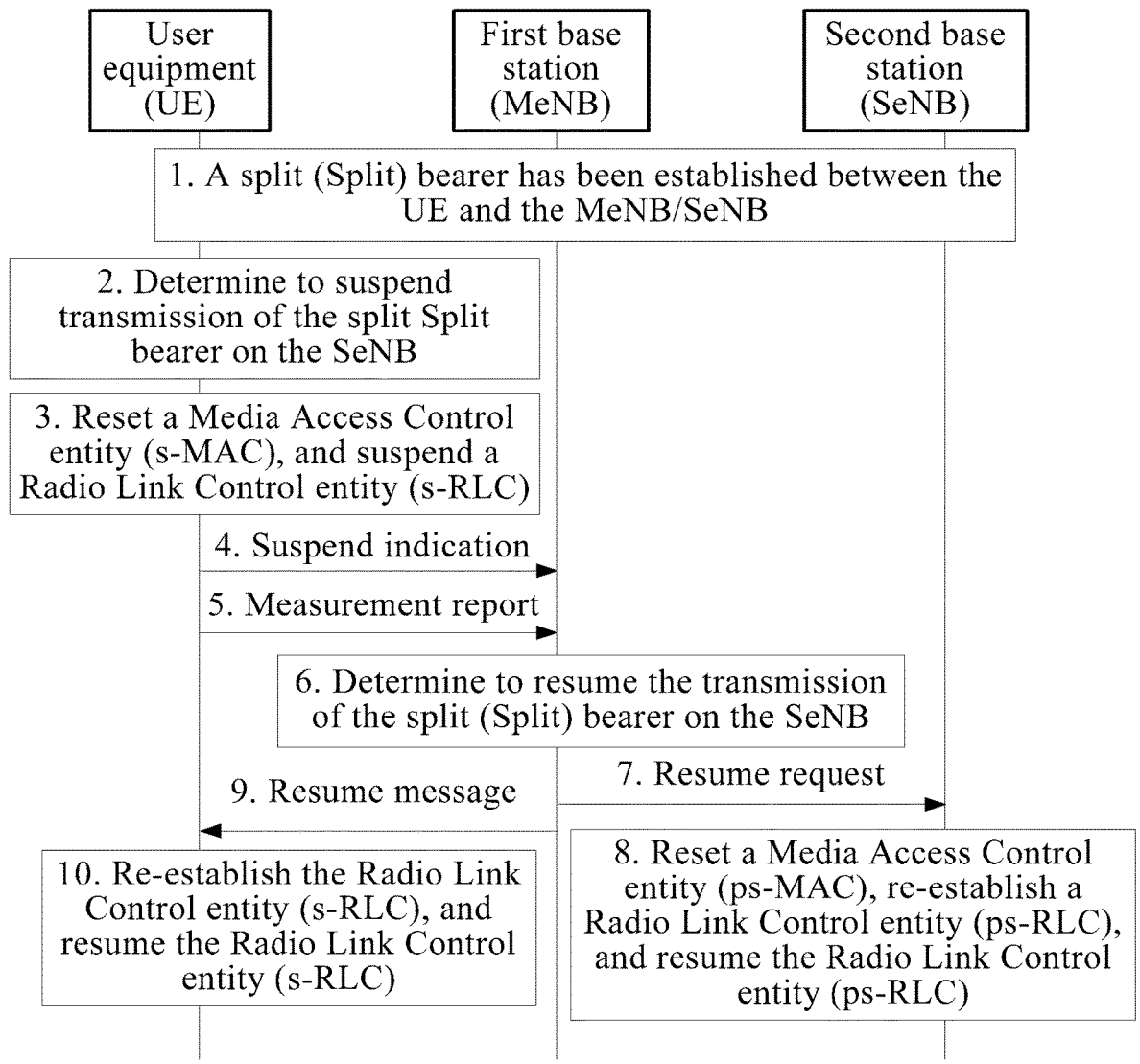
FIG. 6 is a schematic diagram of signaling interaction of a radio bearer processing method according to Embodiment 4 of the present invention.

Further optionally, that the user equipment interacts with the MeNB according to the second measurement result and resumes the data transmission of the Split bearer on the SeNB may be implemented in a manner shown in FIG. 4 or FIG. 6:

sending, by the user equipment, the second measurement result to the MeNB, so that the MeNB determines, according to the second measurement result, whether to resume the data transmission of the Split bearer on the SeNB; and if the MeNB determines, according to the second measurement result, that the data transmission of the Split bearer on the SeNB needs to be resumed, receiving, by the user equipment, a resume command sent by the MeNB, re-establishing, according to the resume command, the Radio Link Control entity s-RLC in the user equipment and resuming the s-RLC, where the s-RLC is associated with the Split bearer and corresponds to the SeNB. Optionally, the resume command includes a bearer identifier of the Split bearer. In this case, in addition to sending the resume command to the user equipment, the MeNB may further send a second resume request to the SeNB, and the SeNB performs the following operation according to the second resume request: re-establishing the Radio Link Control entity ps-RLC in the SeNB and resuming the ps-RLC, where the ps-RLC is associated with the bearer; or performs the following operation according to the second resume request: resetting the Media Access Control entity ps-MAC, in the SeNB, that is associated with the bearer, and re-establishing the Radio Link Control entity ps-RLC in the SeNB and resuming the ps-RLC, where the ps-RLC is associated with the bearer.

It should be noted that the measurement report shown in FIG. 4 and FIG. 6 corresponds to the second measurement result in this embodiment. As can be seen from FIG. 4, FIG. 5 and FIG. 6, the difference between the embodiments shown in FIG. 5 and FIG. 6 mainly lies in whether the MeNB determines to resume the Split bearer or the user equipment determines to resume the Split bearer, and when the user equipment determines to resume the Split bearer, air interface signaling overheads can be further reduced. Furthermore, the difference between the embodiment shown in FIG. 4 and the embodiment shown in FIG. 6 mainly lies in that in FIG. 4, after the MeNB receives the suspend indication sent by the user equipment, the user equipment has already suspended the Split bearer, that is, no longer sends data packets of the corresponding Split bearer to the SeNB and no longer receives data packets of the corresponding Split bearer from the SeNB. Therefore, to further avoid useless processing load of the SeNB, the MeNB sends a suspend request to the SeNB, so that the SeNB also suspends the data transmission of the Split bearer on the SeNB.

In the foregoing embodiments, because the user equipment can determine by itself whether to suspend the data transmission of the Split bearer on the second base station and does not need to interact with the first base station to cause the first base station to determine whether to suspend data transmission of a Split bearer on the second base station, signaling overheads are reduced. In addition, the data transmission of the Split bearer on the SeNB is stopped in a suspended manner, and a protocol entity related to the bearer does not need to be deleted, so that subsequently when the data transmission of the Split bearer on the SeNB is resumed, the Split bearer is resumed, and the protocol entity related to the Split bearer does not need to be re-established, thereby effectively improving utilization of radio bearer resources. Furthermore, the user equipment also can determine by itself whether to resume the data transmission of the Split bearer, which further reduces signaling overheads.

Figure 9:
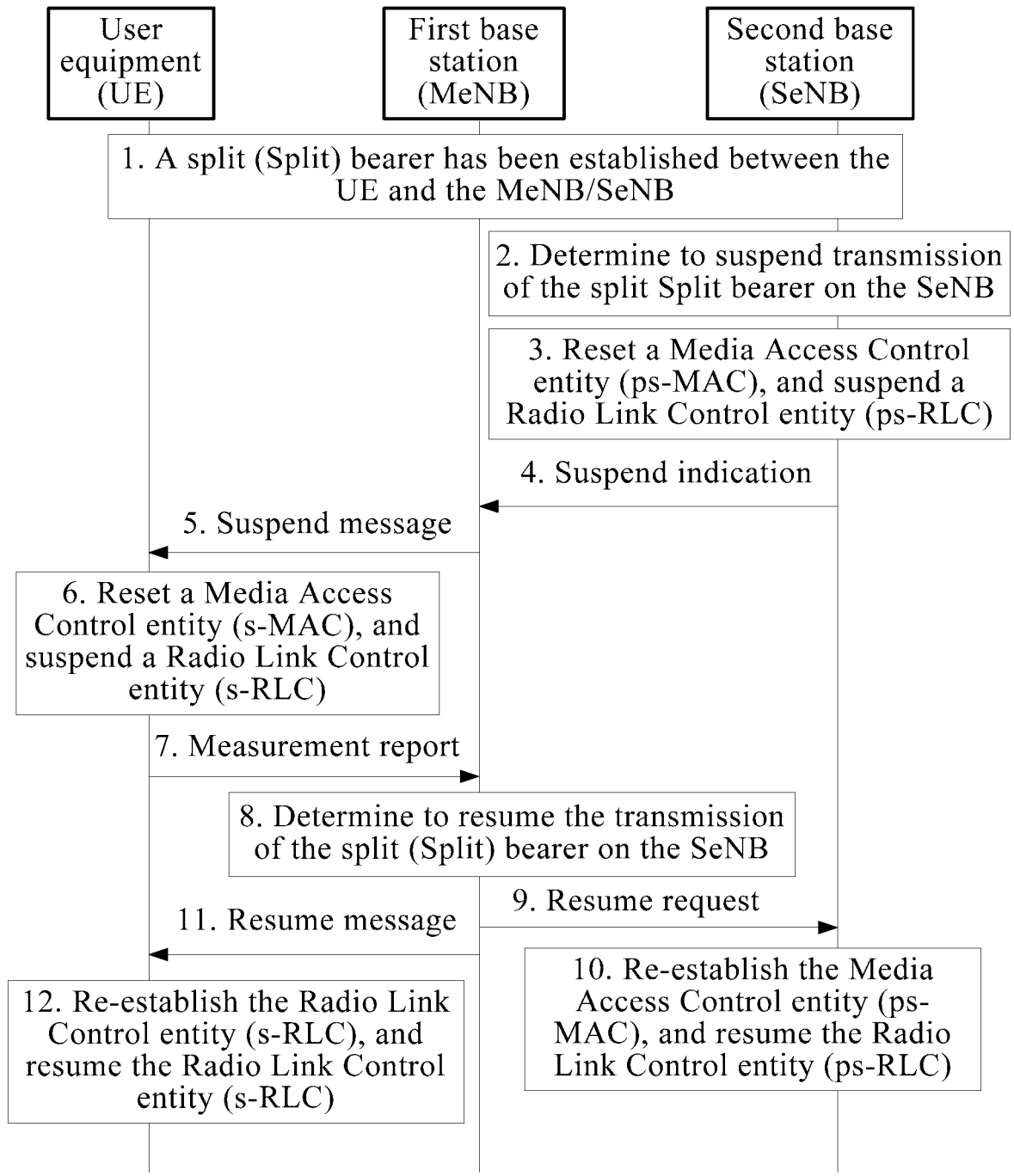
FIG. 9 is a schematic diagram of signaling interaction of a radio bearer processing method according to Embodiment 7 of the present invention.

Further optionally, as shown in FIG. 9, different from the foregoing embodiments in which the user equipment determines by itself whether to suspend the bearer, in FIG. 9, the user equipment may also perform a corresponding suspend operation according to a suspend command delivered by the MeNB.

Specifically, the user equipment receives a suspend command sent by the MeNB, where the suspend command is used to instruct the user equipment to suspend the data transmission of the Split bearer on the SeNB. The suspend command may be sent to the user equipment by the MeNB according to another suspend indication, where the another suspend indication is sent to the MeNB by the SeNB after the SeNB suspends the data transmission of the Split bearer on the SeNB; or the suspend command may be generated by the MeNB after the MeNB determines, according to a first measurement result reported by the user equipment, to suspend the data transmission of the Split bearer on the SeNB.

The user equipment performs the following operation according to the suspend command:

suspending the Radio Link Control entity s-RLC in the user equipment, where the s-RLC is associated with the bearer and corresponds to the SeNB; or the user equipment performs the following operation:

resetting a Media Access Control entity s-MAC in the user equipment, where the s-MAC is associated with the bearer and corresponds to the SeNB, and suspending the Radio Link Control entity s-RLC in the user equipment, where the s-RLC is associated with the bearer and corresponds to the SeNB.

Figure 7:
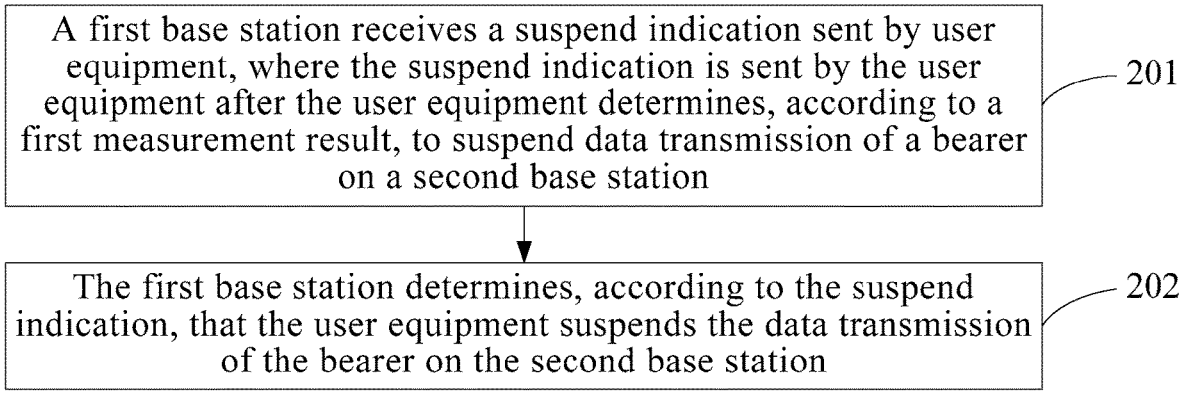
FIG. 7 is a flowchart of a radio bearer processing method according to Embodiment 5 of the present invention.

FIG. 7 is a flowchart of a radio bearer processing method according to Embodiment 5 of the present invention. As shown in FIG. 7, the method includes:

Step 201. A first base station receives a suspend indication sent by user equipment, where the suspend indication is sent by the user equipment after the user equipment determines, according to a first measurement result, to suspend data transmission of a bearer on a second base station.

Step 202. The first base station determines, according to the suspend indication, that the user equipment suspends data transmission of the bearer on the second base station.

Sill by using a Split bearer as an example, the premise of executing the method of this embodiment is that a Split bearer has been established between the user equipment and an MeNB and an SeNB. When determining, according to the first measurement result that is obtained by measuring at least one of preset measurement objects, that the Split bearer is not suitable for data transmission on the SeNB, the user equipment determines to suspend the data transmission of the Split bearer on the SeNB.

Specifically, the user equipment may determine, in the following manner, to suspend the data transmission of the Split bearer on the SeNB:

determining, by the user equipment according to the first measurement result, whether to suspend the data transmission of the Split bearer on the SeNB; and if yes, performing, by the user equipment, the following operation:

suspending a Radio Link Control entity s-RLC in the user equipment, where the s-RLC is associated with the bearer and corresponds to the SeNB; or performing, by the user equipment, the following operation:

resetting a Media Access Control entity s-MAC in the user equipment, where the s-MAC is associated with the bearer and corresponds to the SeNB, and suspending a Radio Link Control entity s-RLC in the user equipment, where the s-RLC is associated with the bearer and corresponds to the SeNB.

The first measurement result is a result obtained by the user equipment by measuring at least one of the following preset measurement objects:

a status of a radio link between the user equipment and the SeNB, signal strength of the SeNB, signal quality of the SeNB, and a quantity or volume of data packets to be sent by the user equipment over the bearer.

Specifically, the user equipment may determine according to a measurement result about the SeNB. For example, the user equipment performs radio link monitoring (RLM) on the SeNB, and when determining according to the RLM that a radio link failure (RLF) occurs in the radio link between the user equipment and the SeNB, the user equipment determines as above. For another example, the user equipment measures the signal strength or quality of the SeNB, and when determining according to a measurement result that the signal strength or quality of the SeNB is lower than a preset threshold, the user equipment determines as above. The user equipment may also make the foregoing decision according to a quantity of data packets to be sent over the Split bearer or a buffer status of data packets to be sent over the Split bearer. For example, the user equipment determines as above when determining that the quantity of data packets to be sent over the Split bearer or a buffer size of data packets to be sent over the Split bearer is less than a preset value.

That the user equipment determines to suspend the transmission of the Split bearer on the SeNB means that the user equipment determines to no longer receive downlink data of the Split bearer from the SeNB and no longer send uplink data of the Split bearer to the SeNB.

Resetting the s-MAC entity specifically includes: emptying a buffer used by the s-MAC, reinitializing a status variable used by the s-MAC, stopping a timer used by the s-MAC, and so on; suspending the s-RLC entity specifically includes stopping processing of data packets by the s-RLC, for example, stopping sending or receiving data packets.

Then, the user equipment sends the suspend indication to the MeNB; after receiving the suspend indication, the MeNB determines that the user equipment has suspended the data transmission of the Split bearer on the SeNB.

In this embodiment, after suspending data transmission of a bearer on a second base station, user equipment sends, to a first base station, a suspend indication that is used to indicate that the user equipment has suspended the data transmission of the bearer on the second base station. Because the user equipment can determine by itself whether to suspend the data transmission of the bearer on the second base station and does not need to interact with the first base station to cause the first base station to determine whether to suspend the data transmission of the bearer on the second base station, signaling overheads are reduced. In addition, the data transmission of the bearer on the second base station is stopped in a suspended manner, and a protocol entity related to the bearer does not need to be deleted, so that subsequently when the data transmission of the bearer on the second base station is resumed, the related protocol entity does not need to be re-established, thereby effectively improving utilization of radio bearer resources.

Optionally, after the MeNB receives the suspend indication sent by the user equipment, the method further includes:

sending, by the MeNB, a suspend request to the SeNB, where the suspend request is used to request the SeNB to suspend the data transmission of the bearer on the SeNB, so that the SeNB performs the following operation according to the suspend request: suspending a Radio Link Control entity ps-RLC in the SeNB, where the ps-RLC is associated with the bearer; or the SeNB performs the following operation according to the suspend request: resetting a Media Access Control entity ps-MAC in the SeNB, where the ps-MAC is associated with the bearer; and suspending a Radio Link Control entity ps-RLC in the SeNB, where the ps-RLC is associated with the bearer. It should be understood that that the SeNB resets the Media Access Control entity ps-MAC, in the SeNB, that is associated with the Split bearer is an optional step, and only when the user equipment has reset the s-MAC during suspension, the SeNB needs to correspondingly reset the ps-MAC.

Further optionally, after the MeNB receives the suspend indication sent by the user equipment, the method further includes:

receiving, by the MeNB, a resume indication sent by the user equipment, where optionally, the resume indication carries a bearer identifier of the Split bearer, and the resume indication is sent by the user equipment after the user equipment determines according to a second measurement result that the data transmission of the Split bearer on the SeNB needs to be resumed; and sending, by the MeNB, a first resume request to the SeNB according to the resume indication, where the first resume request is used to request the SeNB to resume the data transmission of the bearer on the SeNB, so that the SeNB resumes the data transmission of the Split bearer according to the first resume request.

In actual applications, the user equipment may be set to periodically measure the preset measurement object at a particular time interval, and after the user equipment determines, according to a measurement result, to suspend the data transmission of the Split bearer on the SeNB, if another measurement result obtained by the user equipment in a subsequent measurement indicates that data transmission can be continued over the Split bearer, the user equipment determines to resume the Split bearer, and sends a resume indication to the MeNB, as shown in FIG. 5.

Specifically, the user equipment may determine to resume according to a new measurement result about the preset measurement object, that is, the second measurement result. For example, the user equipment performs radio link monitoring (RLM) on the SeNB, and when determining according to the RLM that the radio link between the user equipment and the SeNB returns back to a normal connected state, the user equipment determines to resume. For another example, the user equipment measures the signal strength or quality of the SeNB, and when determining according to a measurement result that the signal strength or quality of the SeNB is higher than a preset threshold, the user equipment determines to resume. For another example, the user equipment may determine according to a quantity of data packets to be sent over the Split bearer or a buffer status of data packets to be sent over the Split bearer. For example, the user equipment determines to resume when determining that the quantity of data packets to be sent over the Split bearer or a buffer size of data packets to be sent over the Split bearer is greater than a preset value.

After receiving the resume indication sent by the user equipment, the MeNB sends the first resume request to the SeNB according to the resume indication, so that the SeNB resumes the data transmission of the Split bearer on the SeNB according to the first resume request.

Specifically, after receiving the first resume request, the SeNB performs the following operation according to the first resume request: re-establishing a Radio Link Control entity ps-RLC in the SeNB and resuming the ps-RLC, where the ps-RLC is associated with the bearer; or performs the following operation according to the first resume request: resetting a Media Access Control entity ps-MAC in the SeNB, where the ps-MAC is associated with the bearer; and re-establishing a Radio Link Control entity ps-RLC in the SeNB and resuming the ps-RLC, where the ps-RLC is associated with the bearer. Re-establishing the ps-RLC entity specifically includes, for example, sending a successfully received data packet to the MeNB, discarding a data packet that needs to be sent but has not been successfully sent, stopping and resetting a timer used by the ps-RLC entity, reinitializing a status variable used by the ps-RLC entity, and so on. Resuming the ps-RLC entity means starting processing of data packets by the ps-RLC entity.

Optionally, the resume request sent by the MeNB may further include a cause indication, where the cause indication is used to indicate a reason of resuming the Split bearer. For example, when a result of measurement on the SeNB by the user equipment is that an RLF occurs in the radio link between the user equipment and the SeNB, the cause indication may have a value of RLF, indicating that the RLF between the user equipment and the SeNB has been removed.

Optionally, the resume request may include two lists. One list is used to contain identifiers of bearers that the SeNB needs to add, and the other list is used to contain identifiers of bearers that the SeNB needs to release. The identifier of the Split bearer that needs to be resumed is contained in both the two lists, in which manner the SeNB is notified that the Split bearer needs to be resumed.

Further optionally, after the MeNB receives the suspend indication sent by the user equipment, the method further includes:

determining, by the MeNB, that the data transmission of the bearer on the SeNB needs to be resumed; and sending, by the MeNB, a resume command to the user equipment, and sending a second resume request to the SeNB, where the resume command is used to instruct the user equipment to resume the data transmission of the bearer on the SeNB, and the second resume request is used to request the SeNB to resume the data transmission of the bearer on the SeNB.

Specifically, that the MeNB determines that the data transmission of the bearer on the SeNB needs to be resumed may be implemented in the following determining manner:

determining, by the MeNB, whether to resume the data transmission of the Split bearer on the SeNB; and if yes, sending, by the MeNB, a resume command to the user equipment, and sending a second resume request to the SeNB, so that the user equipment and the SeNB separately resume the data transmission of the bearer on the SeNB according to the resume command and the second resume request.

That the MeNB determines whether to resume the data transmission of the Split bearer on the SeNB may be implemented in the following manner:

receiving, by the MeNB, the second measurement result sent by the user equipment; and determining, by the MeNB according to the second measurement result, whether to resume the data transmission of the Split bearer on the SeNB.

Different from the foregoing description in which the user equipment determines by itself, according to its new measurement result about the SeNB, whether to resume the data transmission of the Split bearer on the SeNB, in this embodiment, as shown in FIG. 4 and FIG. 6, whether to resume the data transmission of the Split bearer on the SeNB may be determined in the following manner: sending, by the user equipment, a second measurement result to the MeNB, and determining, by the MeNB according to the second measurement result, whether to resume the data transmission of the Split bearer on the SeNB. Similarly, if the second measurement result indicates that data transmission of the Split bearer can be continued on the SeNB, it is determined to resume the data transmission of the Split bearer on the SeNB.

Optionally, the MeNB may determine whether to resume the data transmission of the Split bearer on the SeNB, according to other factors, for example, according to a factor such as a quantity of data packets to be sent over the Split bearer that is measured by the MeNB.

Then, the MeNB sends a resume command to the user equipment, so that the user equipment resumes the data transmission of the Split bearer on the SeNB according to the resume command. Specifically, the user equipment re-establishes, according to the resume command, a Radio Link Control entity s-RLC in the user equipment, where the s-RLC is associated with the bearer and corresponds to the SeNB, and resumes the s-RLC. In addition, the MeNB also sends a second resume request to the SeNB, so that the SeNB resumes the data transmission of the Split bearer on the SeNB according to the second resume request. Specifically, the SeNB performs the following operation according to the second resume request: re-establishing a Radio Link Control entity ps-RLC in the SeNB and resuming the ps-RLC, where the ps-RLC is associated with the bearer; or performs the following operation according to the second resume request: resetting a Media Access Control entity ps-MAC in the SeNB, where the ps-MAC is associated with the bearer; and re-establishing a Radio Link Control entity ps-RLC in the SeNB and resuming the ps-RLC, where the ps-RLC is associated with the bearer.

In this embodiment, because the user equipment can determine by itself whether to suspend the data transmission of the bearer and does not need to interact with the first base station to cause the first base station to determine whether to suspend the data transmission of the bearer on the second base station, signaling overheads are reduced. In addition, the data transmission of the bearer on the second base station is stopped in a suspended manner, and a protocol entity related to the bearer does not need to be deleted, so that subsequently when the data transmission of the bearer on the second base station is resumed, the bearer is resumed, and the protocol entity related to the bearer does not need to be re-established, thereby effectively improving utilization of radio bearer resources. Furthermore, the user equipment also can determine by itself whether to resume the data transmission of the bearer on the second base station, which further reduces signaling overheads.

Figure 8:
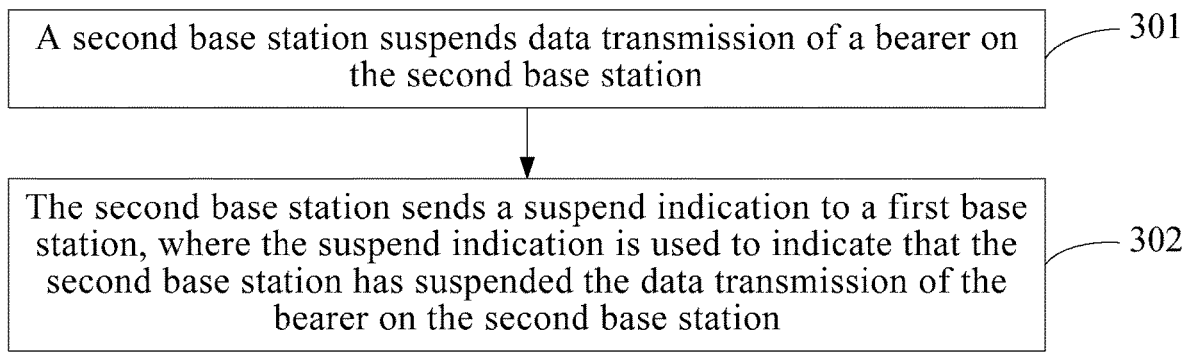
FIG. 8 is a flowchart of a radio bearer processing method according to Embodiment 6 of the present invention.

FIG. 8 is a flowchart of a radio bearer processing method according to Embodiment 6 of the present invention. As shown in FIG. 8, the method includes:

Step 301. A second base station suspends data transmission of a bearer on the second base station.

Step 302. The second base station sends a suspend indication to a first base station, where the suspend indication is used to indicate that the second base station has suspended the data transmission of the bearer on the second base station.

By still using a Split bearer as an example, all the foregoing embodiments are described from the perspective of that a user equipment actively triggers a process of suspending a Split bearer. In this embodiment, optionally, an SeNB may trigger a process of suspending data transmission of a Split bearer on the second base station. Specifically, the SeNB may determine, according to a measurement result, that the data transmission of the bearer on the SeNB needs to be suspended. Specifically, this may be implemented in the following determining manner:

determining, by the SeNB according to the measurement result, whether to suspend the data transmission of the bearer on the second base station; and if yes, performing, by the SeNB, the following operation: suspending a Radio Link Control entity ps-RLC in the SeNB, where the ps-RLC is associated with the bearer; or performing, by the SeNB, the following operation: resetting a Media Access Control entity ps-MAC in the SeNB, where the ps-MAC is associated with the bearer; and suspending a Radio Link Control entity ps-RLC in the SeNB, where the ps-RLC is associated with the bearer.

To distinguish from another measurement result of the user equipment in the following, the foregoing measurement result according to which the SeNB determines that the data transmission of the bearer on the second base station needs to be suspended is referred to as a first measurement result, and the first measurement result is a result obtained by the SeNB by measuring at least one of the following measurement objects:

uplink signal strength of the user equipment, uplink signal quality of the user equipment, and a quantity of times of retransmission of the Radio Link Control entity ps-RLC. Specifically, the SeNB may determine to suspend according to measurement of strength or quality of an uplink signal sent by the user equipment, or the SeNB may determine to suspend according to whether the ps-RLC entity reaches a maximum quantity of times of retransmission, that is, after the ps-RLC sends a data packet to the user equipment, if the ps-RLC does not obtain a successful reception indication fed back by the user equipment, the ps-RLC repeatedly sends the data packet, and after a quantity of times the ps-RLC repeatedly sends the same data packet reached a preset value, the SeNB determines to suspend.

Then, the SeNB sends a suspend indication to the MeNB, where optionally, the suspend indication carries a bearer identifier of the Split bearer, so that the MeNB determines a corresponding user equipment according to the bearer identifier carried in the suspend indication, and sends a suspend command to the determined user equipment according to the suspend indication, so that the user equipment suspends the data transmission of the Split bearer on the SeNB according to the suspend command. The suspend operation of the user equipment has been described in the foregoing embodiments, and details are not described again.

Although the Split bearer between the user equipment and the SeNB has been suspended, the user equipment periodically measures at least one of the following preset measurement objects at a particular time interval: a status of a radio link between the user equipment and the SeNB, signal strength of the SeNB, signal quality of the SeNB, and a quantity or volume of data packets to be sent by the user equipment over the Split bearer. Optionally, the user equipment may determine by itself, according to a measurement result, that is, the second measurement result, whether to resume the data transmission of the Split bearer on the SeNB.

Specifically, the user equipment may determine to resume according to the second measurement result. For example, the user equipment performs radio link monitoring (RLMw) on the SeNB, and when determining according to the RLM that the radio link between the user equipment and the SeNB returns back to a normal connected state, the user equipment determines to resume. For another example, the user equipment measures the signal strength or quality of the SeNB, and when determining according to a measurement result that the signal strength or quality of the SeNB is higher than a preset threshold, the user equipment determines to resume. For another example, the user equipment may also make the foregoing decision according to a quantity of data packets to be sent over the Split bearer or a buffer status of data packets to be sent over the Split bearer. For example, the user equipment determines to resume when determining that the quantity of data packets to be sent over the Split bearer or a buffer size of data packets to be sent over the Split bearer is greater than a preset value.

Further optionally, as shown in FIG. 9, the user equipment may send the second measurement result to the MeNB, so that the MeNB determines, according to the second measurement result, whether to resume the data transmission of the Split bearer on the SeNB, where a condition for the MeNB to determine to resume the data transmission is similar to that for the user equipment, and details are not described again.

Then, after the MeNB determines, according to the second measurement result, that the data transmission of the Split bearer on the SeNB needs to be resumed, as shown in FIG. 9, the MeNB sends a resume request to the SeNB, and the SeNB resumes the data transmission of the Split bearer on the SeNB according to the resume request. Specifically, the SeNB re-establishes a Radio Link Control entity ps-RLC in the SeNB according to the resume request, where the ps-RLC is associated with the Split bearer, and resumes the ps-RLC.

Optionally, after the MeNB determines, according to the second measurement result, to resume the data transmission of the Split bearer on the SeNB, the MeNB may further send a resume command to the user equipment, so that the user equipment resumes the data transmission of the Split bearer.

Figure 10A:
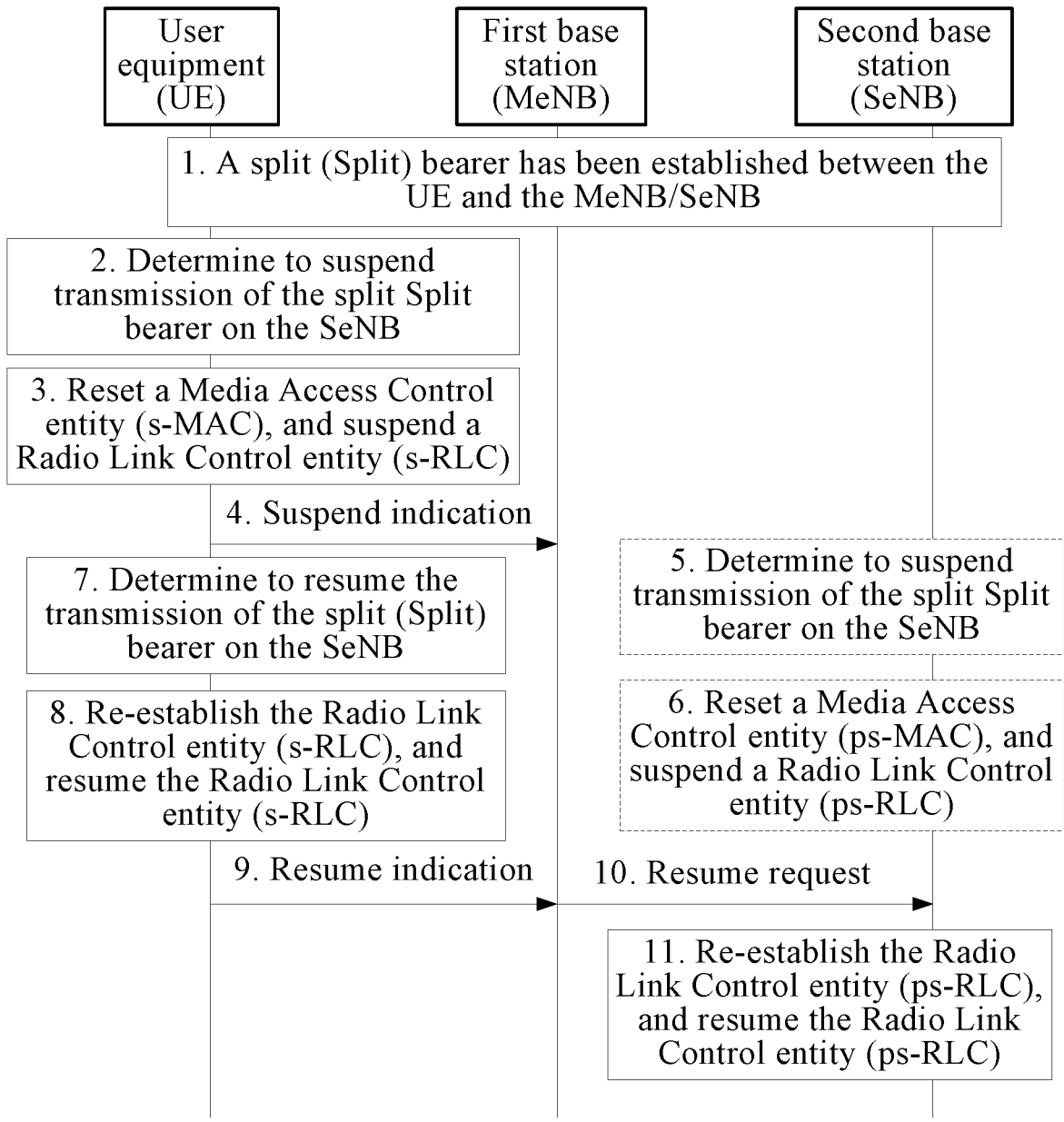
FIG. 10(a) and FIG. 10(b) are schematic diagrams of signaling interaction of a radio bearer processing method according to Embodiment 8 of the present invention.
Figure 10B:
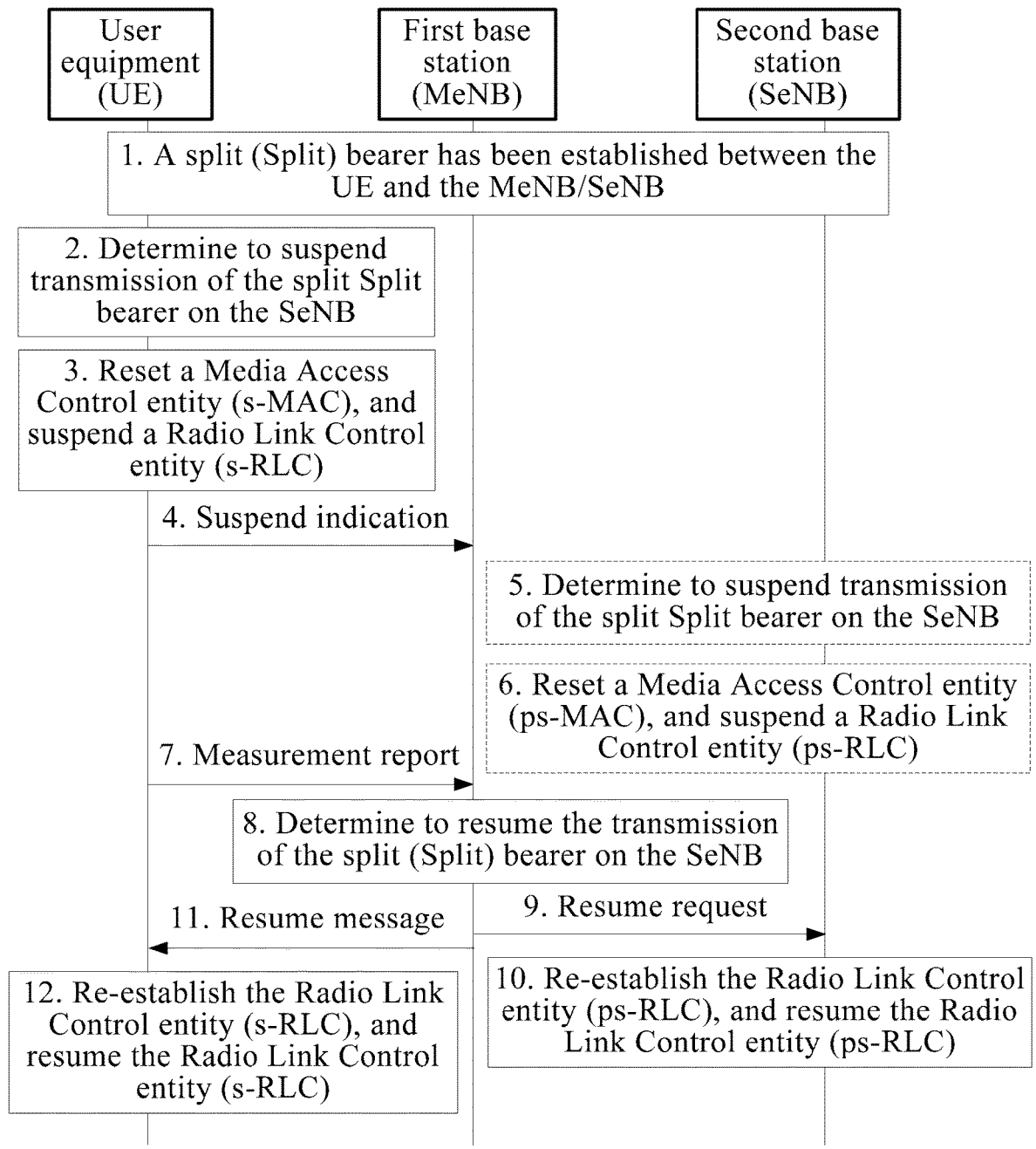

FIG. 10(a) and FIG. 10(b) are schematic diagrams of signaling interaction of a radio bearer processing method according to Embodiment 8 of the present invention. Further optionally, as shown in FIG. 10(a), on the basis of the embodiment shown in FIG. 5, and as shown in FIG. 10(b), on the basis of the embodiment shown in FIG. 6, in a case in which the user equipment actively triggers suspending of a Split bearer and the MeNB does not send a suspend request to the SeNB after receiving a suspend indication sent by the user equipment, the SeNB may determine, according to its measurement of uplink signal strength or quality of the user equipment or according to a measurement result about a quantity of times of retransmission of the Radio Link Control entity ps-RLC in the SeNB, to suspend the data transmission of the Split bearer on the SeNB, reset the Media Access Control entity ps-MAC, in the SeNB, that is associated with the Split bearer, and suspend the Radio Link Control entity ps-RLC, in the SeNB, that is associated with the Split bearer. Correspondingly, after receiving a resume request sent by the MeNB, the SeNB only needs to re-establish the Radio Link Control entity ps-RLC, in the SeNB, that corresponds to the Split bearer, and resume the Radio Link Control entity ps-RLC, in the SeNB, that corresponds to the Split bearer, and no longer needs to reset the Media Access Control entity ps-MAC, in the SeNB, that corresponds to the Split bearer.

It should be understood that in a process in which the user equipment actively triggers suspending of a Split bearer, regardless of whether the MeNB sends a suspend request to the SeNB, the SeNB can trigger a process of suspending the Split bearer by the SeNB. At similar time points, the user equipment and the SeNB experience similar radio channel environments, and a result of measuring a signal of the SeNB or a link between the two by the user equipment is similar to a result of measuring a signal of the user equipment or the link between the two by the SeNB; therefore, even if the SeNB has not received a suspend request from the MeNB, the SeNB can determine, according to its measurement result, whether to suspend the data transmission of the Split bearer on the SeNB.

In this embodiment, because the second base station can determine by itself whether to suspend the data transmission of the Split bearer and does not need to interact with the first base station, signaling overheads are reduced. In addition, the data transmission of the Split bearer on the second base station is stopped by suspending the Split bearer, and a protocol entity related to the Split bearer does not need to be deleted, so that subsequently when the data transmission of the Split bearer on the second base station is resumed, the Split bearer is resumed, and the protocol entity related to the Split bearer does not need to be re-established, thereby effectively improving utilization of radio bearer resources. Furthermore, the user equipment also can determine by itself whether to resume the data transmission of the Split bearer on the second base station, which further reduces signaling overheads.

Figure 11:
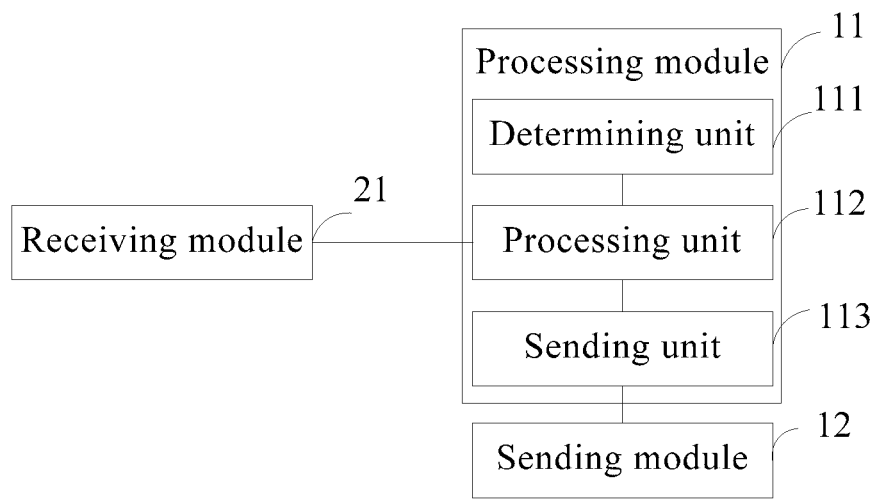
FIG. 11 is a schematic structural diagram of user equipment according to Embodiment 9 of the present invention.

FIG. 11 is a schematic structural diagram of user equipment according to Embodiment 9 of the present invention. As shown in FIG. 11, the user equipment includes:

a processing module 11, configured to suspend data transmission of a bearer on a second base station; and a sending module 12, configured to send a suspend indication to a first base station, where the suspend indication is used to indicate that the user equipment has suspended the data transmission of the bearer on the second base station.

Further, the processing module 11 includes:

a determining unit 111, configured to determine, according to a first measurement result, that the data transmission of the bearer on the second base station needs to be suspended; and a processing unit 112, configured to perform the following operation:

suspending a Radio Link Control entity s-RLC in the user equipment, where the s-RLC is associated with the bearer and corresponds to the second base station; or the processing unit 112 being configured to perform the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

Further, the user equipment further includes:

a receiving module 21, configured to receive a suspend command sent by the first base station, where the suspend command is used to instruct the user equipment to suspend the data transmission of the bearer on the second base station; and correspondingly, the processing unit 112 is further configured to perform the following operation:

suspending a Radio Link Control entity s-RLC in the user equipment, where the s-RLC is associated with the bearer and corresponds to the second base station; or the processing unit 112 is further configured to perform the following operation:

resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

Further, the suspend indication is further used to instruct the first base station to send a suspend request to the second base station, where the suspend request is used to request the second base station to suspend the data transmission of the bearer on the second base station.

Further, the determining unit 111 is further configured to determine, according to a second measurement result, that the data transmission of the bearer on the second base station needs to be resumed;

the processing unit is further configured to re-establish a Radio Link Control entity s-RLC in the user equipment and resume the s-RLC, where the s-RLC is associated with the bearer and corresponds to the second base station; and the processing module 11 further includes:

a sending unit 113, configured to send a resume indication to the first base station, where the resume indication is used to instruct the first base station to send a resume request to the second base station, where the resume request is used to request the second base station to resume the data transmission of the bearer on the second base station.

Further, the sending unit 113 is further configured to send a second measurement result to the first base station; and the processing unit 112 is further configured to receive a resume command sent by the first base station, re-establish, according to the resume command, the Radio Link Control entity s-RLC in the user equipment and resume the s-RLC, where the s-RLC is associated with the bearer and corresponds to the second base station, and the resume command is sent by the first base station after the first base station determines according to the second measurement result that the data transmission of the bearer on the second base station needs to be resumed.

The user equipment of this embodiment may be configured to execute the technical solution of the method embodiment shown in FIG. 3. The implementation principle and technical effect of the user equipment is similar to those of the method embodiment shown in FIG. 3, and details are not described herein again.

Figure 12:
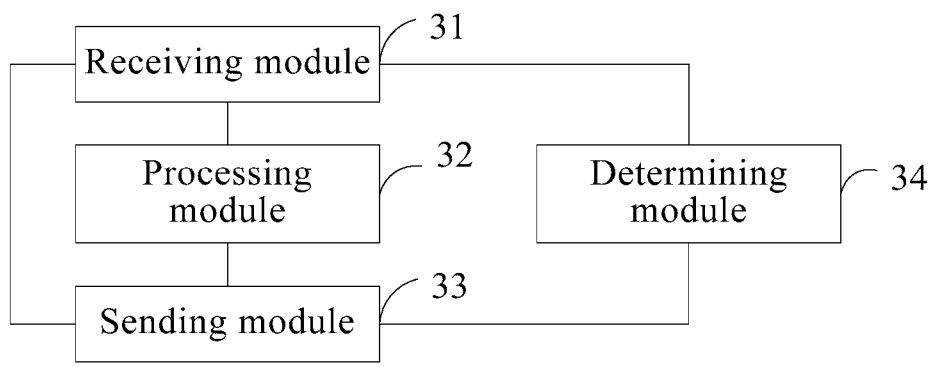
FIG. 12 is a schematic structural diagram of a first base station according to Embodiment 10 of the present invention.

FIG. 12 is a schematic structural diagram of a first base station according to Embodiment 10 of the present invention. As shown in FIG. 12, the first base station includes:

a receiving module 31, configured to receive a suspend indication sent by user equipment; and a processing module 32, configured to determine, according to the suspend indication, that the user equipment suspends data transmission of a bearer on a second base station.

Further, the first base station further includes:

a sending module 33, configured to send a suspend request to the second base station, where the suspend request is used to request the second base station to suspend the data transmission of the bearer on the second base station.

Specifically, the sending module 33 is specifically configured to:

send the suspend request to the second base station, where the suspend request is used to request the second base station to perform the following operation:

suspending a Radio Link Control entity ps-RLC in the second base station, where the ps-RLC is associated with the bearer; or send the suspend request to the second base station, where the suspend request is used to request the second base station to perform the following operation:

resetting a Media Access Control entity ps-MAC in the second base station, where the ps-MAC is associated with the bearer, and suspending a Radio Link Control entity ps-RLC in the second base station, where the ps-RLC is associated with the bearer.

Further, the receiving module 31 is further configured to:

receive a resume indication sent by the user equipment; and the sending module 33 is further configured to: send a first resume request to the second base station according to the resume indication, where the first resume request is used to request the second base station to resume the data transmission of the bearer on the second base station.

Further, the sending module 33 is specifically configured to:

send the first resume request to the second base station according to the resume indication, where the first resume request is used to request the second base station to perform the following operation:

re-establishing a Radio Link Control entity ps-RLC in the second base station and resuming the ps-RLC, where the ps-RLC is associated with the bearer; or send the first resume request to the second base station according to the resume indication, where the first resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

Further, the first base station further includes:

a determining module 34, configured to determine according to that the data transmission of the bearer on the second base station needs to be resumed; and the sending module 33 is further configured to: send a resume command to the user equipment, and send a second resume request to the second base station, where the resume command is used to instruct the user equipment to resume the data transmission of the bearer on the second base station, and the second resume request is used to request the second base station to resume the data transmission of the bearer on the second base station.

Further, the receiving module 31 is further configured to:

receive a second measurement result sent by the user equipment; and the determining module 34 is further configured to determine, according to the second measurement result, that the data transmission of the bearer on the second base station needs to be resumed.

Further, the sending module 33 is specifically configured to:

send a resume command to the user equipment, where the resume command is used to instruct the user equipment to re-establish a Radio Link Control entity s-RLC in the user equipment and resume the s-RLC, where the s-RLC is associated with the bearer and corresponds to the second base station.

Further, the sending module 33 is specifically configured to:

send the second resume request to the second base station, where the second resume request is used to request the second base station to perform the following operation:

re-establishing a Radio Link Control entity ps-RLC in the second base station and resuming the ps-RLC, where the ps-RLC is associated with the bearer; or send the second resume request to the second base station, where the second resume request is used to request the second base station to perform the following operation:

resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

Specifically, the first measurement result and the second measurement result are results obtained by the user equipment by measuring at least one of the following measurement objects:

a status of a radio link between the user equipment and the second base station, signal strength of the second base station, signal quality of the second base station, and a quantity or volume of data packets to be sent by the user equipment over the bearer.

The first base station of this embodiment may be configured to execute the technical solution of the method embodiment shown in FIG. 7. The implementation principle and technical effect of the first base station is similar to those of the method embodiment shown in FIG. 7, and details are not described herein again.

Figure 13:
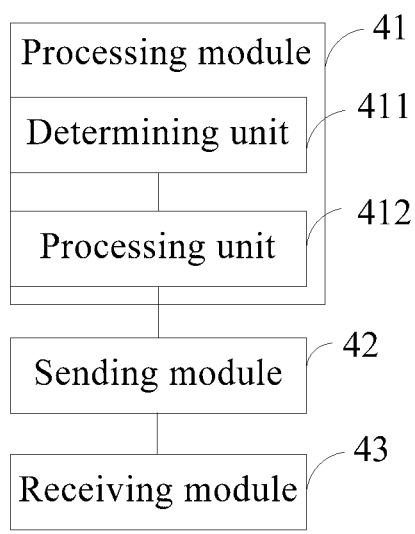
FIG. 13 is a schematic structural diagram of a second base station according to Embodiment 11 of the present invention.

FIG. 13 is a schematic structural diagram of a second base station according to Embodiment 11 of the present invention. As shown in FIG. 13, the second base station includes:

a processing module 41, configured to suspend data transmission of a bearer on the second base station; and a sending module 42, configured to send a suspend indication to a first base station, where the suspend indication is used to indicate that the second base station has suspended the data transmission of the bearer on the second base station.

Further, the processing module 41 includes:

a determining unit 411, configured to determine, according to a measurement result, that the data transmission of the bearer on the second base station needs to be suspended; and a processing unit 412, configured to perform the following operation:

suspending a Radio Link Control entity ps-RLC in the second base station, where the ps-RLC is associated with the bearer; or the processing unit 412 being configured to perform the following operation:

resetting a Media Access Control entity ps-MAC in the second base station, where the ps-MAC is associated with the bearer, and suspending a Radio Link Control entity ps-RLC in the second base station, where the ps-RLC is associated with the bearer.

Further, the suspend indication is further used to instruct the first base station to send a suspend command to user equipment, where the suspend command is used to instruct the user equipment to suspend the data transmission of the bearer on the second base station.

Further, the second base station further includes:

a receiving module 43, configured to receive a resume request sent by the first base station; and the processing module 41 is further configured to resume the data transmission of the bearer on the second base station according to the resume request.

Further, the processing module 41 is specifically configured to:

re-establish a Radio Link Control entity ps-RLC in the second base station according to the resume request, where the ps-RLC is associated with the bearer, and resume the ps-RLC.

Specifically, the measurement result is a result obtained by the second base station by measuring at least one of the following measurement objects:

uplink signal strength of the user equipment, uplink signal quality of the user equipment, and a quantity of times of retransmission of the Radio Link Control entity ps-RLC.

The second base station of this embodiment may be configured to execute the technical solution of the method embodiment shown in FIG. 8. The implementation principle and technical effect of the second base station is similar to those of the method embodiment shown in FIG. 8, and details are not described herein again.

Figure 14:
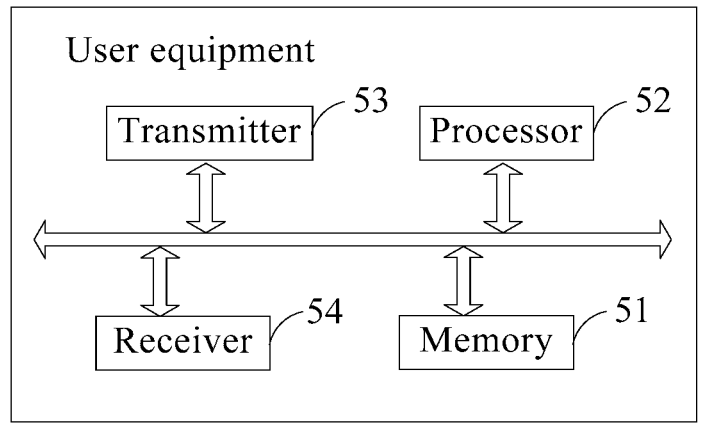
FIG. 14 is a schematic structural diagram of user equipment according to Embodiment 12 of the present invention.

FIG. 14 is a schematic structural diagram of user equipment according to Embodiment 12 of the present invention. As shown in FIG. 14, the user equipment includes:

a memory 51 and a processor 52 connected to the memory 51, where the memory 51 is configured to store a set of program code, and the processor 52 is configured to call the program code stored in the memory 51, to execute the radio bearer processing method shown in FIG. 3: suspending data transmission of a bearer on a second base station; and the user equipment further includes a transmitter 53, where the transmitter 53 is connected to the processor 52 by a bus, and the transmitter is configured to send a suspend indication to a first base station, where the suspend indication is used to indicate that the user equipment has suspended the data transmission of the bearer on the second base station.

Further, the processor 52 is further configured to determine, according to a first measurement result, that the data transmission of the bearer on the second base station needs to be suspended; and the processor 52 is further configured to perform the following operation: suspending a Radio Link Control entity s-RLC in the user equipment, where the s-RLC is associated with the bearer and corresponds to the second base station; or the processor 52 is further configured to perform the following operation: resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

Further, the user equipment further includes a receiver 54, where the receiver 54 is configured to receive a suspend command sent by the first base station, where the suspend command is used to instruct the user equipment to suspend the data transmission of the bearer on the second base station; and the processor 52 is further configured to perform the following operation according to the suspend command: suspending a Radio Link Control entity s-RLC in the user equipment, where the s-RLC is associated with the bearer and corresponds to the second base station; or the processor 52 is further configured to perform the following operation according to the suspend command: resetting a Media Access Control entity s-MAC in the user equipment, where the s-MAC is associated with the bearer and corresponds to the second base station, and suspending a Radio Link Control entity s-RLC in the user equipment, where the s-RLC is associated with the bearer and corresponds to the second base station.

Further, the suspend indication is further used to instruct the first base station to send a suspend request to the second base station, where the suspend request is used to request the second base station to suspend the data transmission of the bearer on the second base station.

Further, the processor 52 is further configured to determine, according to a second measurement result, that the data transmission of the bearer on the second base station needs to be resumed; and re-establish a Radio Link Control entity s-RLC in the user equipment and resume the s-RLC, where the s-RLC is associated with the bearer and corresponds to the second base station.

The transmitter 53 is further configured to send a resume indication to the first base station, where the resume indication is used to instruct the first base station to send a resume request to the second base station, where the resume request is used to request the second base station to resume the data transmission of the bearer on the second base station.

Further, the transmitter 53 is further configured to send the second measurement result to the first base station; and the receiver 54 is further configured to receive a resume command sent by the first base station; and the processor 52 is further configured to re-establish, according to the resume command, the Radio Link Control entity s-RLC in the user equipment and resume the s-RLC, where the s-RLC is associated with the bearer and corresponds to the second base station, and the resume command is sent by the first base station after the first base station determines according to the second measurement result that the data transmission of the bearer on the second base station needs to be resumed.

The first measurement result and the second measurement result are results obtained by the user equipment by measuring at least one of the following measurement objects:

a status of a radio link between the user equipment and the second base station, signal strength of the second base station, signal quality of the second base station, and a quantity or volume of data packets to be sent by the user equipment over the bearer.

Figure 15:
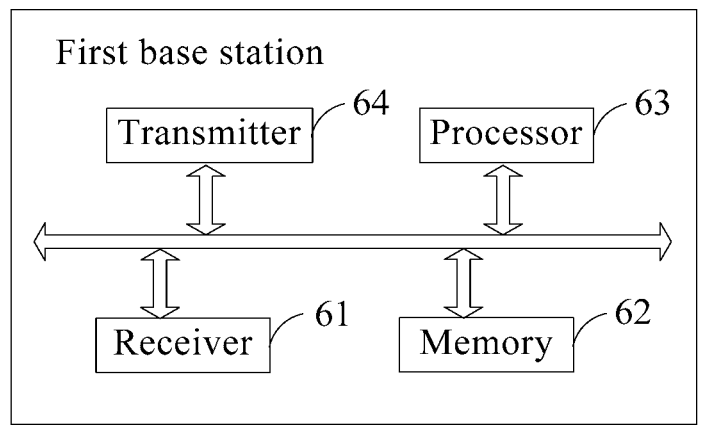
FIG. 15 is a schematic structural diagram of a first base station according to Embodiment 13 of the present invention.

FIG. 15 is a schematic structural diagram of a first base station according to Embodiment 13 of the present invention. As shown in FIG. 15, the first base station includes:

a receiver 61, configured to receive a suspend indication sent by user equipment; and a memory 62 and a processor 63 connected to the memory 62, where the processor 63 is connected to the receiver 61 by a bus, the memory 62 is configured to store a set of program code, and the processor 63 is configured to call the program code stored in the memory 62, to execute the radio bearer processing method shown in FIG. 7: determining, according to the suspend indication, that the user equipment suspends data transmission of a bearer on a second base station.

The first base station further includes a transmitter 64, configured to send a suspend request to the second base station, where the suspend request is used to request the second base station to suspend the data transmission of the bearer on the second base station.

Further, the transmitter 64 is further configured to send the suspend request to the second base station, where the suspend request is used to request the second base station to perform the following operation: suspending a Radio Link Control entity ps-RLC in the second base station, where the ps-RLC is associated with the bearer; or the suspend request is used to request the second base station to perform the following operation: resetting a Media Access Control entity ps-MAC in the second base station, where the ps-MAC is associated with the bearer, and suspending a Radio Link Control entity ps-RLC in the second base station, where the ps-RLC is associated with the bearer.

Further, the receiver 61 is further configured to receive a resume indication sent by the user equipment; and the transmitter 64 is further configured to send a first resume request to the second base station according to the resume indication, where the first resume request is used to request the second base station to resume the data transmission of the bearer on the second base station.

Further, the transmitter 64 is further configured to send the first resume request to the second base station according to the resume indication, where the first resume request is used to request the second base station to perform the following operation: re-establishing a Radio Link Control entity ps-RLC in the second base station and resuming the ps-RLC, where the ps-RLC is associated with the bearer; or the first resume request is used to request the second base station to perform the following operation: resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

Further, the processor 63 is further configured to determine that the data transmission of the bearer on the second base station needs to be resumed; and the transmitter 64 is further configured to send a resume command to the user equipment, and send a second resume request to the second base station, where the resume command is used to instruct the user equipment to resume the data transmission of the bearer on the second base station, and the second resume request is used to request the second base station to resume the data transmission of the bearer on the second base station.

Further, the receiver 61 is further configured to receive a second measurement result sent by the user equipment; and correspondingly, the processor 63 is further configured to determine, according to the second measurement result, that the data transmission of the bearer on the second base station needs to be resumed.

Further, the transmitter 64 is further configured to send a resume command to the user equipment, where the resume command is used to instruct the user equipment to re-establish a Radio Link Control entity s-RLC in the user equipment and resume the s-RLC, where the s-RLC is associated with the bearer and corresponds to the second base station.

Further, the transmitter 64 is further configured to send the second resume request to the second base station, where the second resume request is used to request the second base station to perform the following operation: re-establishing a Radio Link Control entity ps-RLC in the second base station and resuming the ps-RLC, where the ps-RLC is associated with the bearer; or the second resume request is used to request the second base station to perform the following operation: resetting a Media Access Control entity ps-MAC in the second base station, where the ps-MAC is associated with the bearer, and re-establishing a Radio Link Control entity ps-RLC in the second base station and resuming the ps-RLC, where the ps-RLC is associated with the bearer.

Figure 16:
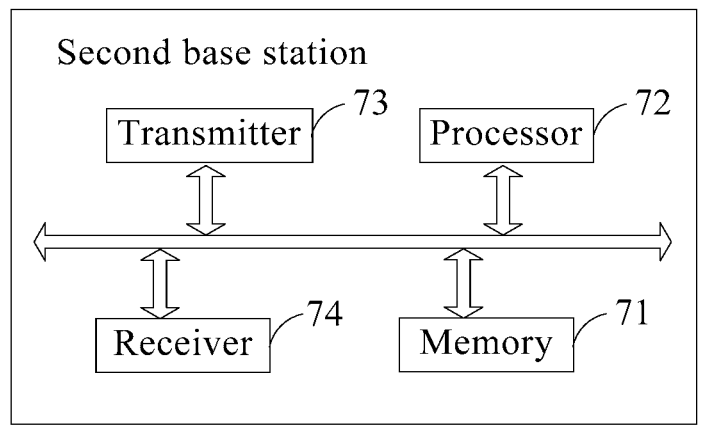
FIG. 16 is a schematic structural diagram of a second base station according to Embodiment 14 of the present invention.

FIG. 16 is a schematic structural diagram of a second base station according to Embodiment 14 of the present invention. As shown in FIG. 16, the second base station includes:

a memory 71 and a processor 72 connected to the memory 71, where the memory 71 is configured to store a set of program code, and the processor 72 is configured to call the program code stored in the memory 71, to execute the radio bearer processing method shown in FIG. 8: suspending data transmission of a bearer on a second base station; and a transmitter 73, where the transmitter 73 is connected to the processor 72 by a bus, and the transmitter 73 is configured to send a suspend indication to a first base station, where the suspend indication is used to indicate that the second base station has suspended the data transmission of the bearer on the second base station.

Further, the processor 72 is further configured to determine, according to a measurement result, that the data transmission of the bearer on the second base station needs to be suspended; and the processor 72 is further configured to perform the following operation: suspending a Radio Link Control entity ps-RLC in the second base station, where the ps-RLC is associated with the bearer; or the processor 72 is further configured to perform the following operation: resetting a Media Access Control entity ps-MAC in the second base station, where the ps-MAC is associated with the bearer, and suspending a Radio Link Control entity ps-RLC in the second base station, where the ps-RLC is associated with the bearer.

Further, the suspend indication is further used to instruct the first base station to send a suspend command to user equipment, where the suspend command is used to instruct the user equipment to suspend the data transmission of the bearer on the second base station.

Further, the second base station further includes: a receiving module 74, configured to receive a resume request sent by the first base station; and the processor 72 is further configured to resume the data transmission of the bearer on the second base station according to the resume request.

Further, the processor 72 is further configured to re-establish a Radio Link Control entity ps-RLC in the second base station according to the resume request, where the ps-RLC is associated with the bearer, and resume the ps-RLC.

The measurement result is a result obtained by the second base station by measuring at least one of the following measurement objects:

uplink signal strength of the user equipment, uplink signal quality of the user equipment, and a quantity of times of retransmission of the Radio Link Control entity ps-RLC.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random-access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention. Additionally, statements made herein characterizing the invention refer to an embodiment of the invention and not necessarily all embodiments.

What is claimed is:

1. A radio bearer processing method, comprising:
   receiving, by a first base station, a suspend indication sent by a user equipment, wherein the suspend indication is generated according to a first measurement result measured by the user equipment;
   determining, by the first base station according to the suspend indication, that the user equipment has suspended data transmission with respect to a bearer on a second base station;
   receiving, by the first base station, a plurality of second measurement results sent by the user equipment, wherein the plurality of second measurement results are results periodically obtained by measuring a quantity of data packets to be sent by the user equipment over the bearer;
   determining, by the first base station, according to one or more of the second measurement results, that data transmission with respect to the bearer on the second base station needs to be resumed; and
   sending, by the first base station, a resume command to the user equipment, and sending a second resume request to the second base station, wherein the resume command is for instructing the user equipment to resume data transmission with respect to the bearer on the second base station, and the second resume request is for requesting the second base station to resume data transmission with respect to the bearer on the second base station.

2. The method according to claim 1, wherein the resume command is further for instructing the user equipment to re-establish a Radio Link Control entity (s-RLC) in the user equipment and resume the s-RLC, wherein the s-RLC is associated with the bearer and corresponds to the second base station.

3. The method according to claim 1, wherein the second resume request is further for requesting the second base station to re-establish a Radio Link Control entity (ps-RLC) in the second base station and resume the ps-RLC, wherein the ps-RLC is associated with the bearer.

4. The method according to claim 1, wherein the second resume request is further for requesting the second base station to reset a Media Access Control entity (ps-MAC) in the second base station, wherein the ps-MAC is associated with the bearer, and re-establish a Radio Link Control entity (ps-RLC) in the second base station and resume the ps-RLC, wherein the ps-RLC is associated with the bearer.

5. A first base station, comprising a processor and a non-transitory computer-readable medium having processor-executable instructions stored thereon, wherein the processor-executable instructions, when executed by the processor, facilitate:
   receiving a suspend indication sent by a user equipment, wherein the suspend indication is generated according to a first measurement result measured by the user equipment;
   determining, according to the suspend indication, that the user equipment has suspended data transmission with respect to a bearer on a second base station;
   receiving a plurality of second measurement results sent by the user equipment, wherein the plurality of second measurement results are results periodically obtained by measuring a quantity of data packets to be sent by the user equipment over the bearer;
   determining, according to one or more of the second measurement results, that data transmission with respect to the bearer on the second base station needs to be resumed; and
   sending, by the first base station, a resume command to the user equipment, and sending a second resume request to the second base station, wherein the resume command is for instructing the user equipment to resume data transmission with respect to the bearer on the second base station, and the second resume request is for requesting the second base station to resume data transmission with respect to the bearer on the second base station.

6. The first base station according to claim 5, wherein the resume command is further for instructing the user equipment to re-establish a Radio Link Control entity (s-RLC) in the user equipment and resume the s-RLC, wherein the s-RLC is associated with the bearer and corresponds to the second base station.

7. The first base station according to claim 5, wherein the second resume request is further for requesting the second base station to re-establish a Radio Link Control entity (ps-RLC) in the second base station and resume the ps-RLC, wherein the ps-RLC is associated with the bearer.

8. The first base station according to claim 5, wherein the second resume request is further for requesting the second base station to reset a Media Access Control entity (ps-MAC) in the second base station, wherein the ps-MAC is associated with the bearer, and re-establish a Radio Link Control entity (ps-RLC) in the second base station and resume the ps-RLC, wherein the ps-RLC is associated with the bearer.

* * * * *